(12) United States Patent  
Shoji

(10) Patent No.: US 7,543,498 B2  
(45) Date of Patent: Jun. 9, 2009

(54) SPRING MEMBER FOR ACCELERATION SENSOR, ACCELERATION SENSOR AND MAGNETIC DISK DRIVE APPARATUS

(75) Inventor: Shigeru Shoji, Tokyo (JP)

(73) Assignee: TDK Corporation, Tokyo (JP)

( * ) Notice: Subject to any disclaimer, the term of this patent is extended or adjusted under 35 U.S.C. 154(b) by 225 days.

(21) Appl. No.: 11/549,820

(22) Filed: Oct. 16, 2006

(65) Prior Publication Data

US 2007/0119253 A1     May 31, 2007

(30) Foreign Application Priority Data

Nov. 24, 2005    (JP)   ............... 2005-338328

(51) Int. Cl.  
    *G01P 15/11*    (2006.01)
(52) U.S. Cl. .................................. 73/514.31
(58) Field of Classification Search ............. 73/514.31, 73/514.16, 514.29; 324/207.21  
See application file for complete search history.

(56) References Cited

U.S. PATENT DOCUMENTS

| | | | |
|---|---|---|---|
| 5,747,991 A | 5/1998 | Ito et al. | |
| 6,131,457 A | 10/2000 | Sato | |
| 7,392,704 B2* | 7/2008 | Shoji | ................. 73/514.31 |
| 2006/0101911 A1 | 5/2006 | Shoji | |
| 2007/0169552 A1* | 7/2007 | Shoji et al. | ............. 73/514.31 |
| 2007/0180911 A1* | 8/2007 | Shoji | ................. 73/514.31 |
| 2007/0186654 A1* | 8/2007 | Shoji | ................. 73/514.16 |

FOREIGN PATENT DOCUMENTS

| | | |
|---|---|---|
| FR | 2 861 464 | 4/2005 |
| JP | 2-248867 | 10/1990 |
| JP | 3-25162 | 3/1991 |
| JP | 2005-291746 | 10/2005 |
| JP | 2007-64825 | 3/2007 |

OTHER PUBLICATIONS

U.S. Appl. No. 11/482,796, filed Jul. 10, 2006, Shoji.  
U.S. Appl. No. 11/453,090, filed Jun. 15, 2006, Shoji.  
U.S. Appl. No. 11/483,099, filed Jul. 10, 2006, Shoji.  
U.S. Appl. No. 11/414,301, filed May 1, 2006, Shoji.  
U.S. Appl. No. 11/549,820, filed Oct. 16, 2006, Shoji.  
U.S. Appl. No. 11/549,768, filed Oct. 16, 2006, Shoji, et al.  
U.S. Appl. No. 11/623,949, filed Jan. 17, 2007, Shoji.  
U.S. Appl. No. 11/668,202, filed Jan. 29, 2007, Shoji.

* cited by examiner

*Primary Examiner*—Helen C. Kwok  
(74) *Attorney, Agent, or Firm*—Oblon, Spivak, McClelland, Maier & Neustadt, P.C.

(57) ABSTRACT

A spring member used in an acceleration sensor, for supporting weight members that cooperate as magnetic field generation members or magnetic field detection sensors includes at least one strip-shaped plate spring with a fulcrum and support sections separated from the fulcrum for supporting the weight members. The at least one strip-shaped plate spring is configured to produce a bending stress in response to an external force applied so as to displace the weight members.

9 Claims, 20 Drawing Sheets

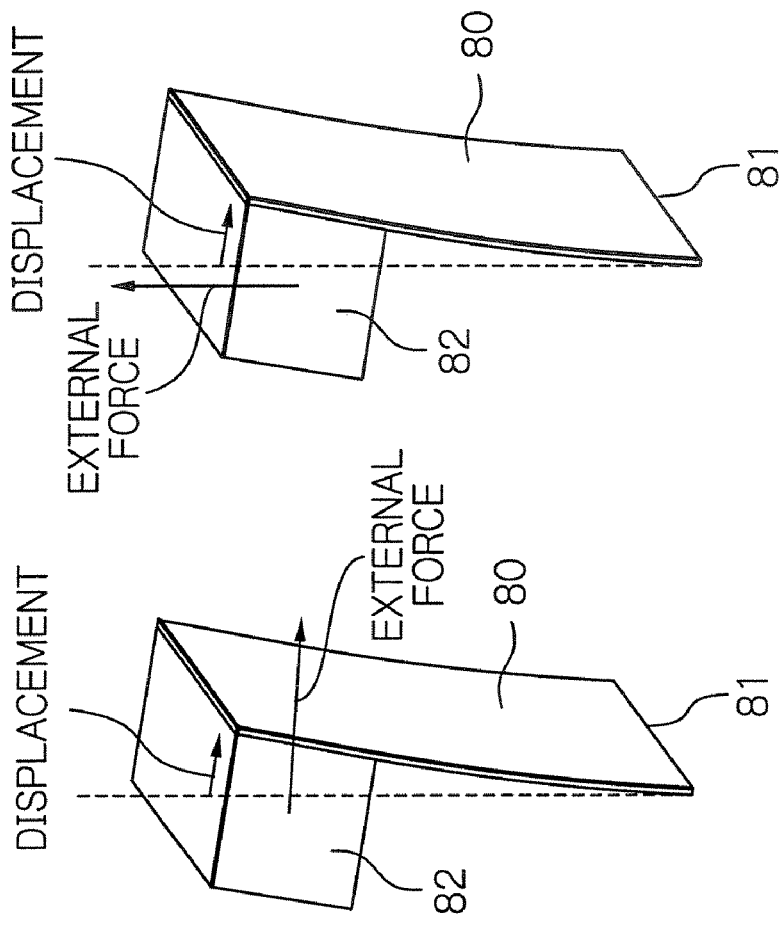
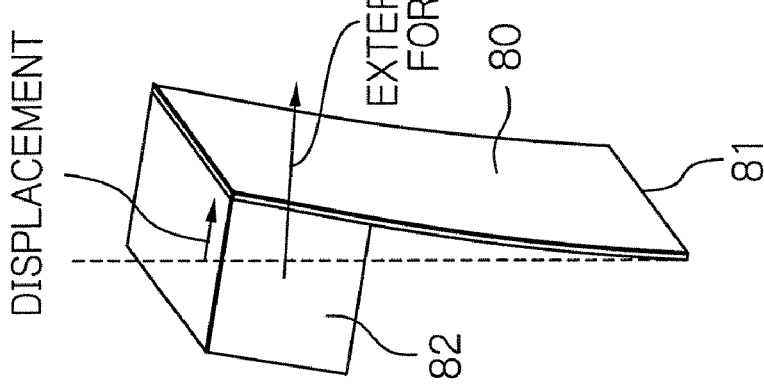
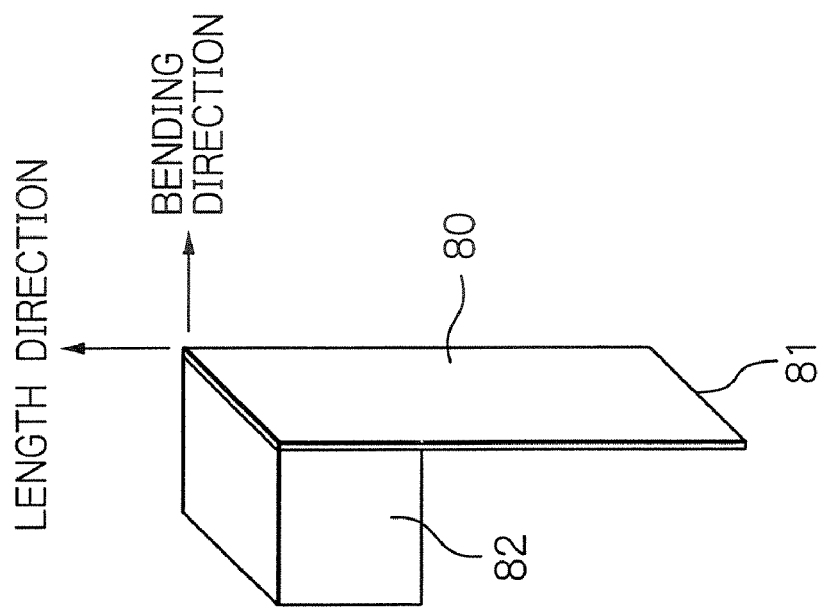

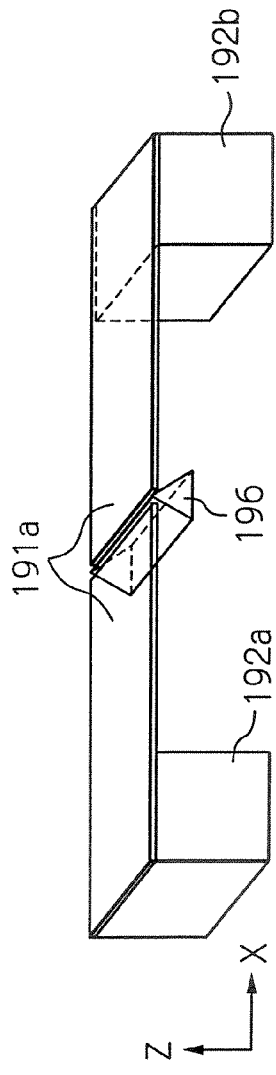
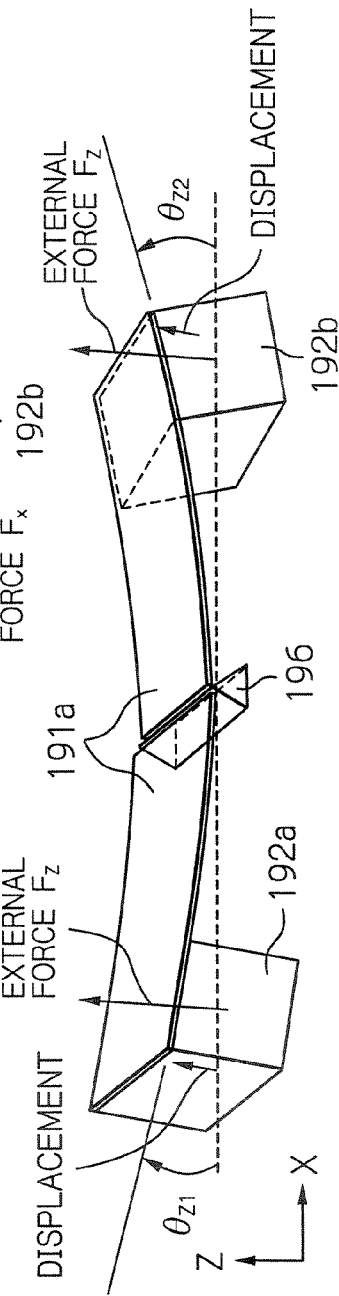
Fig. 24a  Fig. 24b  Fig. 24c

SPRING MEMBER FOR ACCELERATION SENSOR, ACCELERATION SENSOR AND MAGNETIC DISK DRIVE APPARATUS

PRIORITY CLAIM

This application claims priority from Japanese patent application No. 2005-338328, filed on Nov. 24, 2005, which is incorporated herein by reference.

BACKGROUND OF THE INVENTION

1. Field of the Invention

The present invention relates to a spring member for an acceleration sensor using magnetoresistive effect (MR) elements, to the acceleration sensor using the spring member, and to a magnetic disk drive apparatus with the acceleration sensor.

2. Description of the Related Art

In a magnetic disk drive apparatus or a hard disk drive (HDD) apparatus assembled in a mobile equipment such as for example a walkabout personal computer, a mobile phone, a digital audio player and other mobile gear, an HDD apparatus used as a mobile storage itself or a removable HDD apparatus, in order to prevent a collision of a magnetic head with a hard disk surface due to drop impact, it is necessary to detect the instant at which the HDD apparatus is falling before occurrence of the drop impact and to retract the magnetic head from the hard disk surface. Such instant of the falling can be detected from a slight change in the acceleration of gravity.

Japanese patent publication No. 02-248867A discloses a piezo-electric type acceleration sensor for detecting a small change in the acceleration of gravity from a change in stress of springs. This sensor has springs in dual tuning fork vibrators, a weight supported by the springs, and piezo-electric elements attached on the springs to detect the change in stress applied to the springs from the weight.

U.S. Pat. No. 5,747,991 discloses an electrostatic capacitance type acceleration sensor for detecting a small change in the acceleration of gravity from a displacement of a weight. This sensor disclosed in U.S. Pat. No. 5,747,991 has a movable electrode and a static electrode facing each other to detect a change in electrostatic capacitance from a change in distance between the movable and static electrodes due to the acceleration.

Such known piezo-electric type acceleration sensor or electrostatic capacitance type acceleration sensor needs to have electrodes for extracting detection signals there from on the spring or the weight attached to the spring, and also lead lines electrically connected to the electrodes. Thus, the structure of the sensor becomes complicated due to the lead lines connected to the electrodes. Also, when the spring and weight are miniaturized, wiring process of such lead lines becomes extremely difficult. Further, the lead lines formed on the miniaturized spring or weight may induce breakage of the lead lines when an excessive value of impact is applied, and prevent movement of the spring to interface with the improvement in sensitivity of the sensor. This tendency becomes more pronounced as the acceleration sensor becomes smaller.

U.S. Pat. No. 6,131,457 discloses an acceleration sensor that may solve the above-mentioned problems in the conventional piezo-electric type acceleration sensor and electrostatic capacitance type acceleration sensor. This acceleration sensor has a permanent magnet including a mass point on an axis along a Z-axis, mounted to a vibrator supported by four stays capable of elastic deformation such as twisting and bending to have three-dimensional freedom, and four or more MR detector elements positioned on an X-axis and a Y-axis with their centers located along a perimeter of a concentric circle around the origin point of the orthogonal coordinate axes. The sensor is thus capable of detecting each of acceleration in the direction of X-axis through a relative difference in output voltage between the two detector elements on the X-axis due to a vibration of the magnetic field from the magnet, acceleration in the direction of Y-axis through a relative difference in output voltage between the two detector elements on the Y-axis due to a vibration of the magnetic field from the magnet, and acceleration in the direction of Z-axis through a sum total of the output voltages of all the detector elements.

According to the above-mentioned acceleration sensor disclosed in U.S. Pat. No. 6,131,457, the permanent magnet is fixed to the vibrator supported by the four stays or springs so that a rotational moment produced by the applied acceleration is balanced with the twisting stress of these stays and the angle change of the permanent magnet under the balanced conditions is detected.

In general, a spring constant or stiffness of the twisting stress of the plate spring is greater than that of the bending stress. Therefore, a displacement amount due to the twisting stress is smaller than that due to the bending stress. Thus, when using an acceleration sensor with the springs that mainly utilize the twisting stress as that described in U.S. Pat. No. 6,131,457, because of the smaller displacement amount of the springs, it is difficult to enhance sensitivity in detection of acceleration. In order to improve the sensitivity by increasing the displacement amount of the springs, it is necessary to increase the whole size of the springs. However, this runs against the demand for miniaturization of the acceleration sensor.

SUMMARY OF THE INVENTION

It is therefore an object of the present invention to provide a spring member for an acceleration sensor, the acceleration sensor, and a magnetic disk drive apparatus with the acceleration sensor, whereby it is possible to extremely miniaturize the acceleration sensor, and highly sensitive detection of acceleration can be expected even though having an extremely miniaturized structure.

According to the present invention, a spring member used in an acceleration sensor, for supporting weight members that cooperate as magnetic field generation members or magnetic field detection sensors includes at least one strip-shaped plate spring with a fulcrum and support sections separated from the fulcrum for supporting the weight members. The at least one strip-shaped plate spring is configured to produce a bending stress in response to an external force applied so as to displace the weight members.

Because the strip-shaped plate spring produces bending stress in response to the externally applied force so as to displace the weight members in the bending direction to reach balance, the spring member can be configured to have an extremely small size, a large displacement amount and high sensitivity. Therefore, it is possible to provide an acceleration sensor that can expect highly sensitive detection of acceleration even though having an extremely miniaturized structure.

It is preferred that the at least one strip-shaped plate spring consists of two strip-shaped plate springs, and that each strip-shaped plate spring has the fulcrum at one end and the support section for supporting the weight member at the other end.

It is also preferred that the at least one strip-shaped plate spring consists of a single strip-shaped plate spring having the fulcrum at its center and the support sections for supporting the weight members at its both ends.

According to the present invention, also, a spring member used in an acceleration sensor, for supporting magnetic field generation members or magnetic field detection members that cooperate as weight members includes a first strip-shaped plate spring with a fulcrum at its center, and two second strip-shaped plate springs with the centers connected to both ends of the first strip-shaped plate spring, respectively. Each second strip-shaped plate spring has support sections at its both ends for supporting the weight members. The first strip-shaped plate spring is configured to produce a bending stress or twisting stress in response to an external force applied so as to displace the weight members, and the two second strip-shaped plate springs are configured to produce bending stresses in response to the applied external force so as to displace the weight members.

Because the strip-shaped plate spring produces bending stress in response to the externally applied force so as to displace the weight members in the bending direction to reach balance, the spring member can be configured to have an extremely small size, a large displacement amount and high sensitivity. Therefore, it is possible to provide an acceleration sensor that can expect highly sensitive detection of acceleration even though having an extremely miniaturized structure.

It is preferred that the spring member further includes a strip-shaped support member directly fixed to each second strip-shaped plate spring or fixed to the weight members attached to the support sections at the both ends of each strip-shaped plate spring, to control spring function of each second strip-shaped plate spring.

According to the present invention, further, an acceleration sensor includes a housing member, magnetic field generation members with weights, a spring member with a fulcrum attached to the housing member, and magnetic field detection sensors attached to the housing member to face the magnetic field generation members with weights. The spring member includes at least one strip-shaped plate spring with support sections separated from the fulcrum for supporting the magnetic field generation members with weights. The at least one strip-shaped plate spring is configured to produce a bending stress in response to an external force applied so as to displace the magnetic field generation members with weights.

Because the strip-shaped plate spring of the spring member produces bending stress in response to the externally applied force so as to displace the weight members in the bending direction to reach balance, the spring member can be configured to have an extremely small size, a large displacement amount and high sensitivity. Therefore, it is possible to provide an acceleration sensor that can expect highly sensitive detection of acceleration even though having an extremely miniaturized structure. Also, according to the present invention, because it is not necessary to form electrodes on the spring member and the magnetic field generation members with weights, the wiring structure can be simplified. According to the present invention, further, because a bias magnetic field from the magnetic field generation members with weights is applied to the magnetic field detection sensors, insensitivity to possible external electrical field and external magnetic field applied thereto can be expected.

It is preferred that the at least one strip-shaped plate spring consists of two strip-shaped plate springs, and that each strip-shaped plate spring has the fulcrum at one end and the support section for supporting the magnetic field generation members with weights at the other end.

It is also preferred that the at least one strip-shaped plate spring consists of a single strip-shaped plate spring having the fulcrum at its center and the support sections for supporting the magnetic field generation members with weights at its both ends.

It is further preferred that each magnetic field detection sensor has at least one pair of multi-layered MR elements each including a magnetization fixed layer and a magnetization free layer. The magnetization fixed layer is magnetically fixed along a direction parallel to a direction of displacement of the at least one strip-shaped plate spring. Each magnetic field generation member with weight has at least one permanent magnet arranged to apply magnetic field to the at least one pair of multi-layered MR elements. The magnetic field applied is substantially perpendicular to a lamination plane of the at least one pair of multi-layered MR elements when no acceleration is applied.

It is still further preferred that the at least one permanent magnet consists of a pair of permanent magnets arranged in parallel to each other so that their surfaces facing the respective magnetic field detection sensors have different magnetic polarities with each other.

It is further preferred that each pair of multi-layered MR elements are arranged to face each pair of permanent magnets, respectively.

It is also preferred that each multi-layered MR element consists of a giant magnetoresistive effect (GMR) element or a tunnel magnetoresistive effect (TMR) element.

Further, according to the present invention, an acceleration sensor includes a housing member, four magnetic field generation members with weights, a spring member with a fulcrum attached to the housing member, and at least three magnetic field detection sensors attached to the housing member to face at least three of the four magnetic field generation members with weights, respectively. The spring member includes a first strip-shaped plate spring with the fulcrum at its center, and two second strip-shaped plate springs with the centers connected to both ends of the first strip-shaped plate spring, respectively. Each second strip-shaped plate spring has support sections at its both ends for supporting the four magnetic field generation members with weights. The first strip-shaped plate spring is configured to produce a bending stress or twisting stress in response to an external force applied so as to displace the magnetic field generation members with weights, and the two second strip-shaped plate springs are configured to produce bending stresses in response to the applied external force so as to displace the magnetic field generation members with weights.

Because the strip-shaped plate spring of the spring member produces bending stress in response to the externally applied force so as to displace the weight members in the bending direction to reach balance, the spring member can be configured to have an extremely small size, a large displacement amount and high sensitivity. Therefore, it is possible to provide an acceleration sensor that can expect highly sensitive detection of acceleration even though having an extremely miniaturized structure.

If the four support sections of the two second strip-shaped plate springs are formed in the same structure and shape, it is possible to provide an acceleration sensor with uniform sensitivity and detection directivity of any of the X-axis, Y-axis and Z-axis direction accelerations to be detected. Also, according to the present invention, because it is not necessary to form electrodes on the spring member and the magnetic field generation members with weights, the wiring structure can be simplified. According to the present invention, further, because a bias magnetic field from the magnetic field generation members with weights is applied to the magnetic field detection sensors, insensitivity to possible external electrical field and external magnetic field applied thereto can be expected.

It is preferred that each magnetic field detection sensor has at least one pair of multi-layered MR elements each including a magnetization fixed layer and a magnetization free layer. The magnetization fixed layer is magnetically fixed along a direction parallel to a direction of displacement of the first strip-shaped plate spring. Each magnetic field generation member with weight has at least one permanent magnet arranged to apply magnetic field to the at least one pair of multi-layered MR elements. The magnetic field applied is substantially perpendicular to a lamination plane of the at least one pair of multi-layered MR elements when no acceleration is applied.

Since the magnetization fixed layer is magnetically fixed along a direction parallel to a direction of displacement of the strip-shaped plate spring, the multi-layered MR sensors detect change in the bias magnetic field only in this direction. Thus, it is possible to separately detect the accelerations in the X-axis direction and the Y-axis direction from each other.

Because the magnetization vector is detected by the magnetic field detection sensor provided with at least one multi-layered MR element including a magnetization fixed layer and a magnetization free layer, such as for example a GMR element or a TMR element, the amount of and the positive and negative of acceleration in each direction to be detected can be sensed by each magnetic field detection sensor. Therefore, the number of the magnetic field detection sensor can be decreased and also the structure of each magnetic field detection sensor can be extremely simplified resulting the total size of the acceleration sensor to extremely miniaturize. Furthermore, because the GMR element or TMR element is quite sensitive in magnetic field change, highly sensitive acceleration detection can be expected. In addition, because of a low impedance, the acceleration sensor according to the present invention is relatively unaffected by external disturbance when compared with the piezo-electric type acceleration sensor and the electrostatic capacitance type acceleration sensor.

It is also preferred that the acceleration sensor further includes a strip-shaped support member directly fixed to each second strip-shaped plate spring or fixed to the magnetic field generation members with weights attached to the support sections at the both ends of each second strip-shaped plate spring, to control spring function of each second strip-shaped plate spring.

It is further preferred that the at least one permanent magnet consists of a pair of permanent magnets arranged in parallel to each other so that their surfaces facing the respective magnetic field detection sensors have different magnetic polarities with each other.

It is still further preferred that each pair of multi-layered MR elements are arranged to face each pair of permanent magnets, respectively.

It is also preferred that each multi-layered MR element consists of a GMR element or a TMR element.

According to the present invention, further, a magnetic disk drive apparatus has the above-mentioned acceleration sensor.

Further objects and advantages of the present invention will be apparent from the following description of the preferred embodiments of the invention as illustrated in the accompanying drawings.

BRIEF DESCRIPTION OF THE DRAWINGS

FIGS. 8a, 8b and 8c are oblique views illustrating fundamental operations of a strip-shaped plate spring of a spring member according to the present invention;

FIGS. 24a, 24b and 24c are oblique views illustrating operations of the spring member shown in FIG. 19.

DESCRIPTION OF THE PREFERRED EMBODIMENTS

Figure 1:
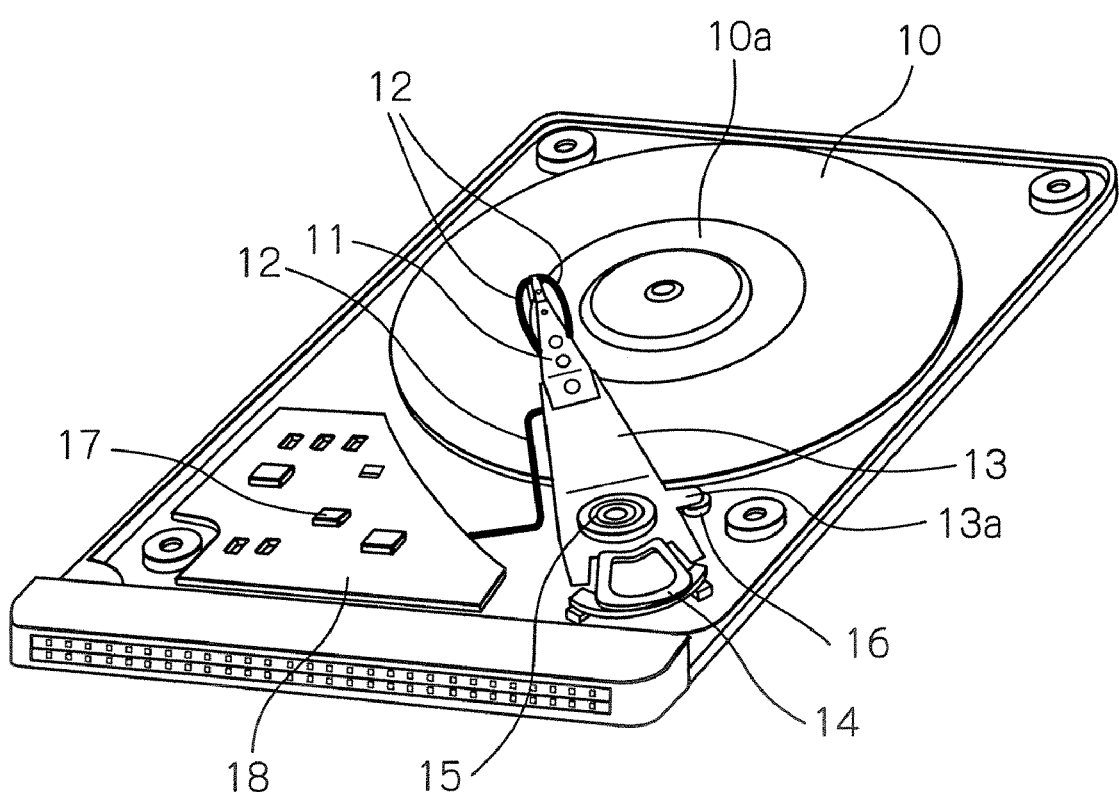
FIG. 1 is an oblique view schematically illustrating a whole structure of an example of a magnetic disk drive apparatus with an acceleration sensor assembled therein.

FIG. 1 schematically illustrates a whole structure of an example of a magnetic disk drive apparatus with an acceleration sensor assembled therein. This magnetic disk drive apparatus is a micro HDD apparatus using at least one magnetic disk of for example 2.5 inches, 1.8 inches, 1.3 inches, or 1.0 or less inches. Such micro HDD apparatus may be an HDD apparatus assembled in mobile equipment such as for example a walkabout personal computer, a mobile phone, a digital audio player or other mobile gear, or an HDD apparatus used itself as a mobile storage or a removable HDD.

In the figure indicating uncovered state of the magnetic disk drive apparatus, reference numeral 10 denotes a magnetic disk rotated by a spindle motor in operation, and 10a denotes a retracted zone of the magnetic disk 10, with no written data. A magnetic head moves into the retracted zone upon detection of drop of the magnetic disk drive apparatus. In the figure, also, reference numeral 11 denotes a head gimbal assembly (HGA). The magnetic head facing to the magnetic disk 10 in operation is attached at the top end section of this HGA 11. Reference numeral 12 denotes a flexible printed circuit (FPC) that is a lead conductor member electrically connected to the magnetic head, 13 denotes a support arm for supporting the HGA 11, 14 denotes a voice coil motor (VCM) that is an actuator for positioning the magnetic head by pivoting the support arm 13 about an axis 15, 16 denotes a ramp on which a tub 13a of the support arm 13 is climbed to lift the magnetic head away from the magnetic disk surface upon detection of drop, and 17 denotes an acceleration sensor mounted on a circuit board 18, respectively.

Figure 2:
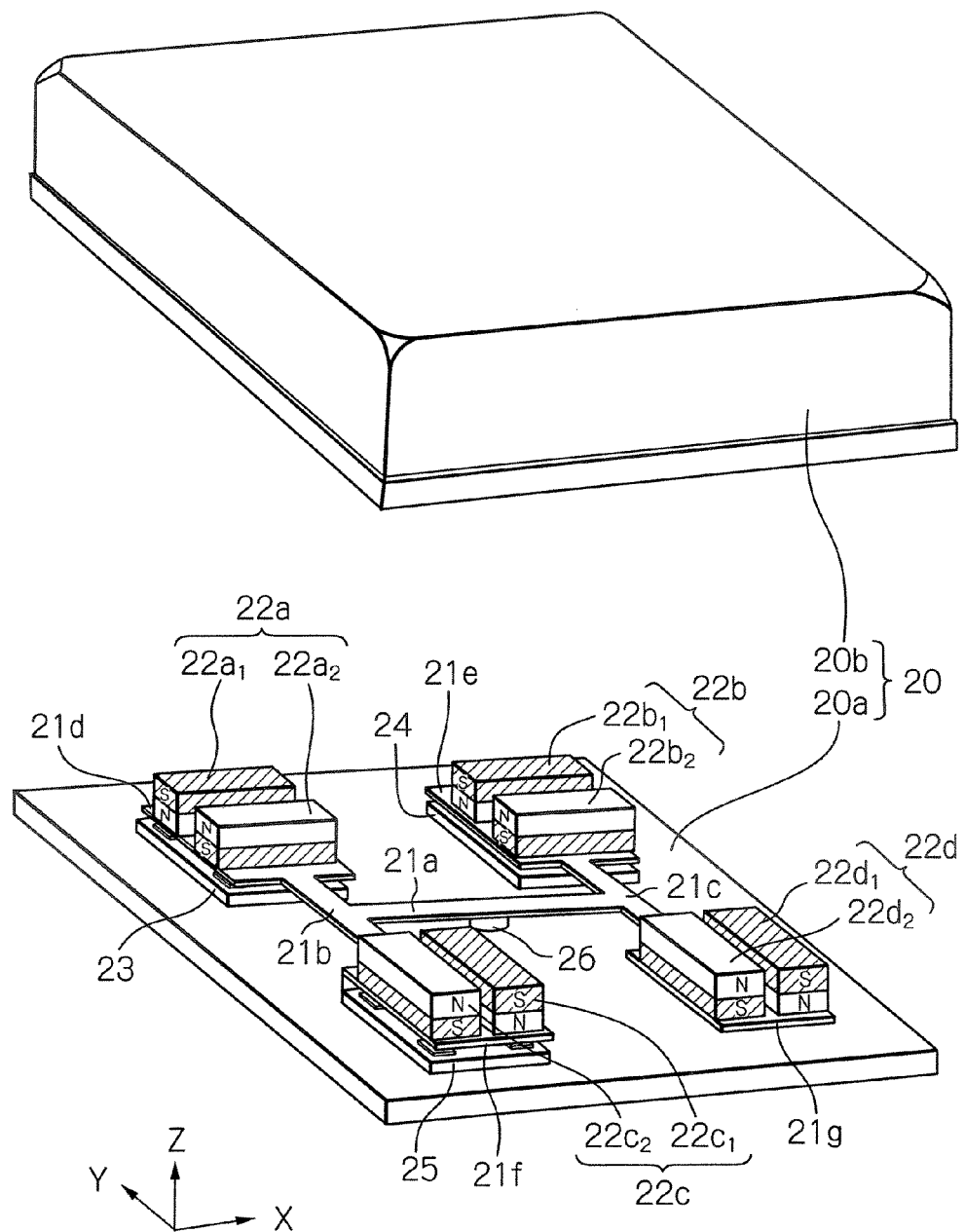
FIG. 2 is an exploded oblique view schematically illustrating a whole structure of an acceleration sensor as a preferred embodiment according to the present invention.
Figure 3:
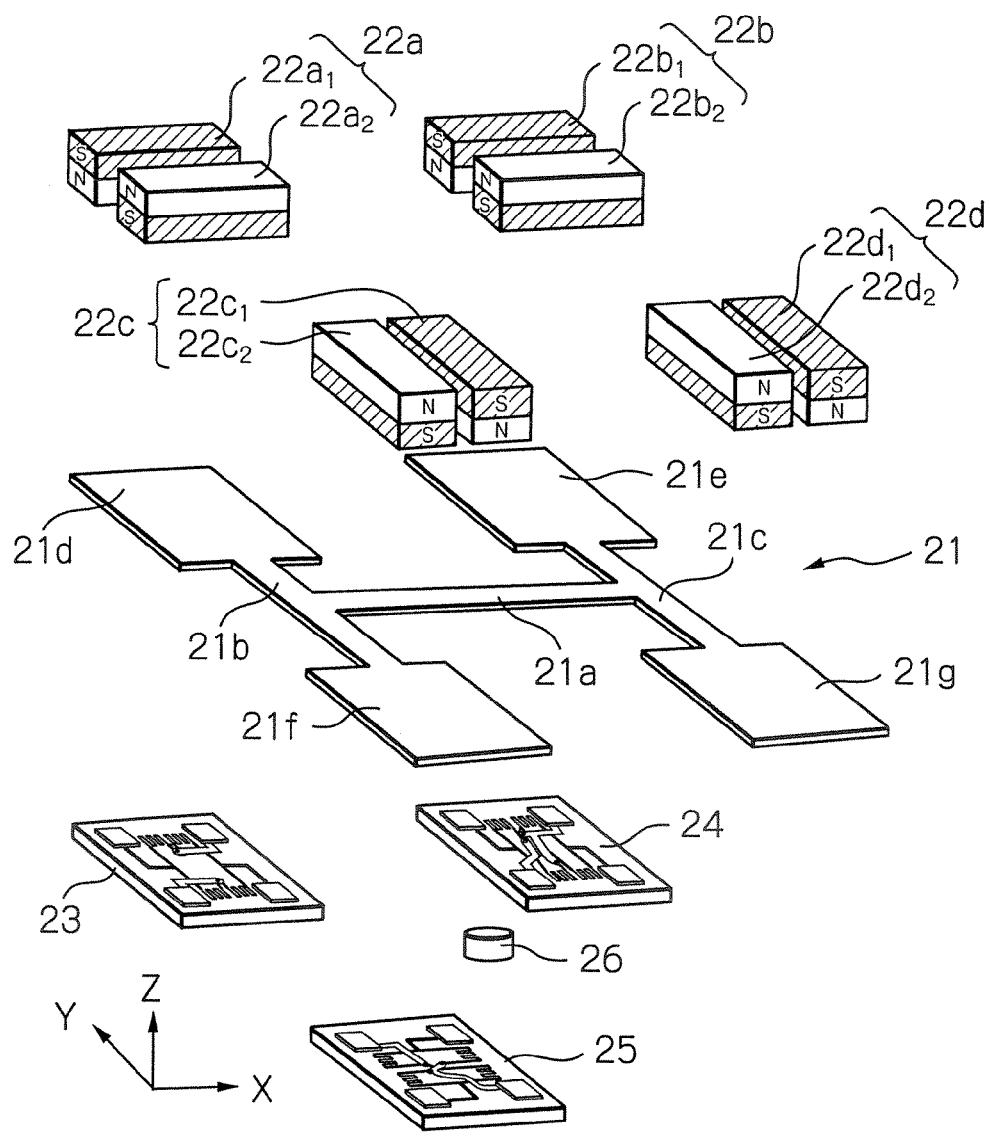
FIG. 3 is an exploded oblique view schematically illustrating structures of a spring member, magnetic field generation members with weights and magnetic filed detection sensors mounted in a housing member of the acceleration sensor shown in FIG. 2.

FIG. 2 schematically illustrates a whole structure of the acceleration sensor 17 as a preferred embodiment according to the present invention, and FIG. 3 illustrates structures of a spring member, magnetic field generation members with weights and magnetic field detection sensors mounted in a housing member of the acceleration sensor.

The acceleration sensor in this embodiment is used for detecting accelerations in three axes of X-axis direction, Y-axis direction and Z-axis direction. The acceleration sensor has a spring member 21, four magnetic field generation members with weights 22a-22d, a first magnetic field detection sensor 23 for detecting the X-axis and the Z-axis accelerations, a second magnetic field detection sensor 24 for detecting the X-axis and the Z-axis accelerations, a third magnetic field detection sensor 25 for detecting the Y-axis acceleration, and a fulcrum member 26, accommodated in the housing member 20. The spring member 21 is integrally formed from a first strip-shaped plate spring 21a, two second strip-shaped plate springs 21b and 21c, and four weight-support sections 21d-21g for supporting the four magnetic field generation members with weights 22a-22d. The four magnetic field generation members with weights 22a-22d have the same constitutions in dimension, in shape and in weight with each other, but directions of length of their permanent magnets are not the same.

The housing member 20 consists of a flat-shaped wiring board 20a with a substrate made of a resin material such as for example polyimide or BT resin and a wiring pattern (not shown) formed on and in the substrate, and a cover member 20b made of a magnetic metal material for covering and for sealing the wiring board 20a. In this embodiment, accelerations along three axes that are in X-axis direction, Y-axis direction and Z-axis direction can be detected by the three magnetic field detection sensors 23-25 mounted on a single plane of the wiring board 20a.

The spring member 21 is integrally formed from a thin-film metal plate made of for example NiFe, Ni or else, from a thin plate made of for example stainless steel, or from a thin resin plate made of for example polyimide, to have a shape shown in FIG. 3.

The first strip-shaped plate spring 21a functions as a main spring, and produces a bending stress and/or a twisting stress in response to an externally applied force. The center of the first strip-shaped plate spring 21a constitutes a fulcrum and is fixed to one end of the fulcrum member 26. The other end of the fulcrum member 26 is fixed to the wiring board 20a. The two second strip-shaped plate springs 21b and 21c function as sub-springs, and produce only a bending stress in response to an externally applied force. The centers of these second strip-shaped plate springs 21b and 21c are unitarily connected to the both ends of the first strip-shaped plate spring 21a, respectively. The both ends of the second strip-shaped plate springs 21b and 21c are unitarily connected to the weight-support sections 21d-21g that have the same shape to each other, respectively. In this embodiment, each of the weight-support sections 21d-21g is shaped in a rectangular. However, in modifications, it may be formed in a circular shape or other shape.

The magnetic field generation members with weights 22a-22d are fixed by an adhesive on one surfaces, that are opposite to the other surfaces faced to the magnetic field detection sensors, of the weight-support sections 21d-21g of the spring member 21, respectively. These magnetic field generation members with weights 22a-22d have four pairs of permanent magnets $22a_1$, and $22a_2$, $22b_1$, and $22b_2$, $22c_1$, and $22c_2$, and $22d_1$, and $22d_2$ for generating magnetic fields, respectively.

The first magnetic field detection sensor 23 for the X-axis and the Z-axis, the second magnetic field detection sensor 24 for the X-axis and the Z-axis and the third magnetic field detection sensor 25 for the Y-axis are fixed by an adhesive on the wiring board 20a so as to face the three-magnetic field generation members with weights 22a-22c of the four-magnetic field generation members with weights 22a-22d, in other words so as to face the other surfaces of the weight-support sections 21d-21f, respectively. Therefore, magnetic fields with angles that change depending upon the accelerations are applied to the first to third magnetic field detection sensors 23-25 from the magnetic field generation members with weights 22a-22c, respectively. In this embodiment, the magnetic field generation member with weight 22d is provided only for keeping balance of the spring member 21.

The pair of permanent magnets $22a_1$ and $22a_2$ is made of a ferrite material and shaped in a rectangular parallelepiped shape running in parallel with each other along the X-axis direction. These permanent magnets $22a_1$, and $22a_2$ face to the first magnetic field detection sensor 23 for the X-axis and the Z-axis. The pair of permanent magnets $22a_1$ and $22a_2$ is arranged so that their surfaces facing the first magnetic field detection sensor 23 have different magnetic polarities with each other. A closed magnetic loop is formed by these permanent magnets $22a_1$, and $22a_2$. As will be mentioned later, spin valve GMR elements in the first magnetic field detection sensor 23 are arranged within this closed magnetic loop so that a magnetic field or bias field is applied in a direction substantially perpendicular to the lamination plan of these spin valve GMR elements.

The pair of permanent magnets $22b_1$ and $22b_2$ is made of a ferrite material and shaped in a rectangular parallelepiped shape running in parallel with each other along the X-axis direction. These permanent magnets $22b_1$, and $22b_2$ face to the second magnetic field detection sensor 24 for the X-axis and the Z-axis. The pair of permanent magnets $22b_1$, and $22b_2$ is arranged so that their surfaces facing the second magnetic field detection sensor 24 have different magnetic polarities with each other. A closed magnetic loop is formed by these permanent magnets $22b_1$, and $22b_2$. As will be mentioned later, spin valve GMR elements in the second magnetic field detection sensor 24 are arranged within this closed magnetic loop so that a magnetic field or bias field is applied in a direction substantially perpendicular to the lamination plan of these spin valve GMR elements.

The pair of permanent magnets $22c_1$ and $22c_2$ is made of a ferrite material and shaped in a rectangular parallelepiped shape running in parallel with each other along the Y-axis direction. These permanent magnets $22c_1$ and $22c_2$ face to the third magnetic field detection sensor 25 for the Y-axis and the Z-axis. The pair of permanent magnets $22c_1$ and $22c_2$ is arranged so that their surfaces facing the third magnetic field detection sensor 25 have different magnetic polarities with each other. A closed magnetic loop is formed by these permanent magnets $22c_1$ and $22c_2$. As will be mentioned later, spin valve GMR elements in the third magnetic field detection sensor 25 are arranged within this closed magnetic loop so that a magnetic field or bias field is applied in a direction substantially perpendicular to the lamination plan of these spin valve GMR elements.

Figure 4:
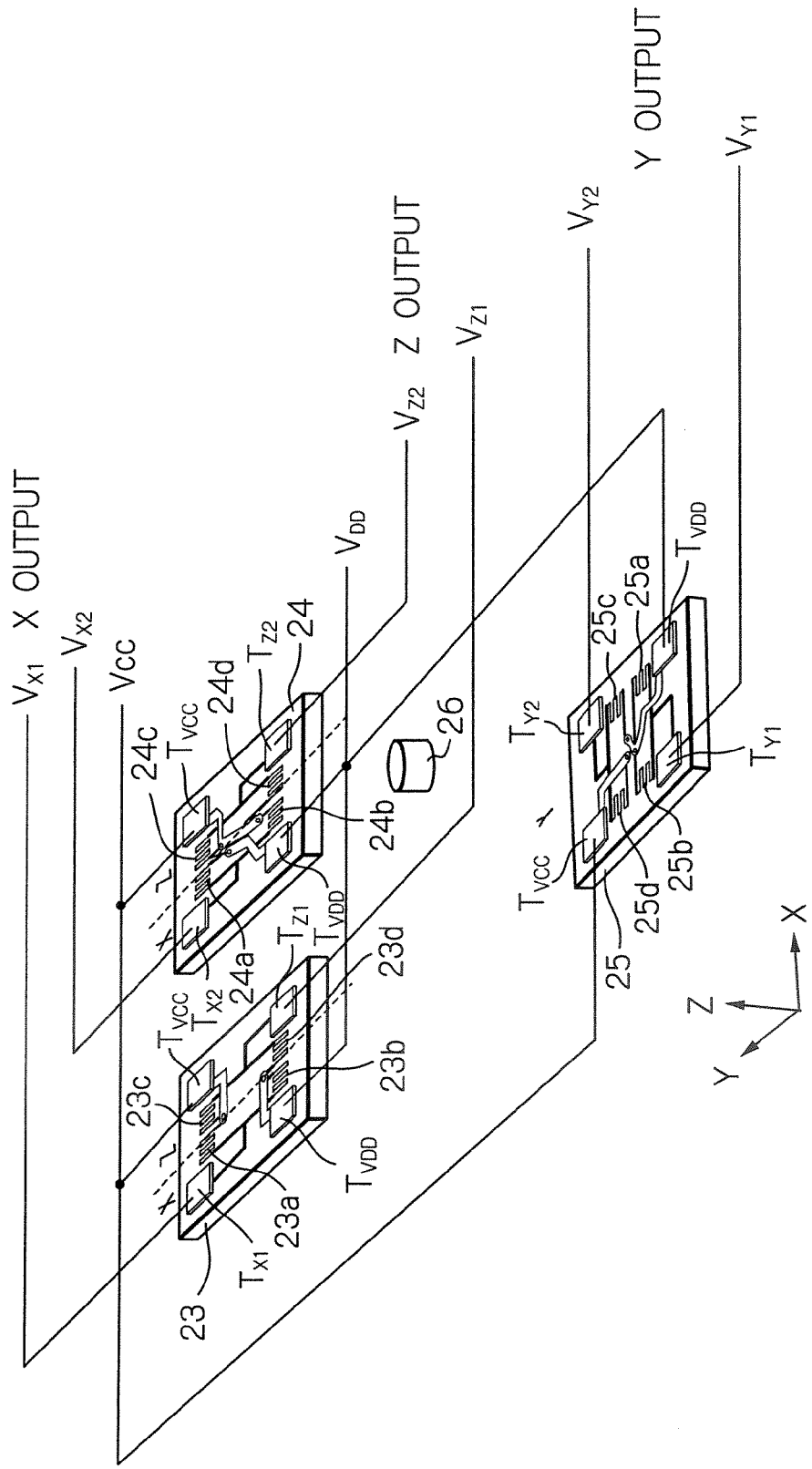
FIG. 4 is a view schematically illustrating electrical connections on a wiring board, and structures of the magnetic filed detection sensors in the acceleration sensor shown in FIG. 2.
Figure 5:
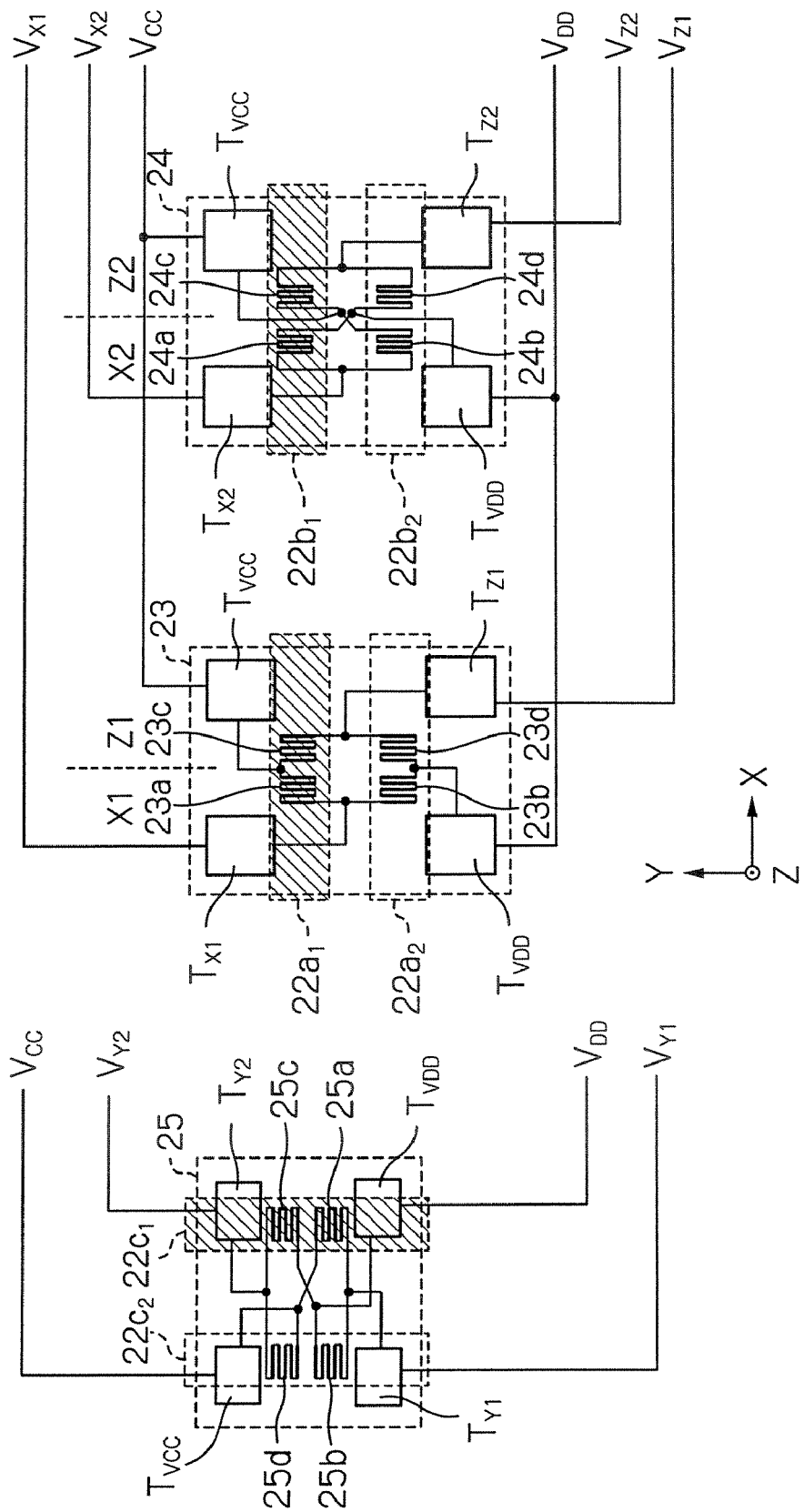
FIG. 5 is a circuit diagram illustrating electrical connection structures of the wiring board and the magnetic filed detection sensors in the acceleration sensor shown in FIG. 2.
Figure 6A:
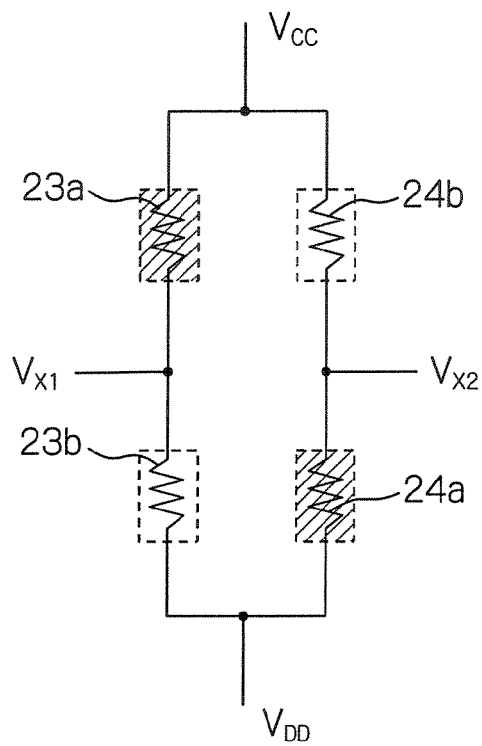
FIGS. 6a, 6b and 6c are equivalent circuit diagrams of the acceleration sensor shown in FIG. 2.
Figure 6B:
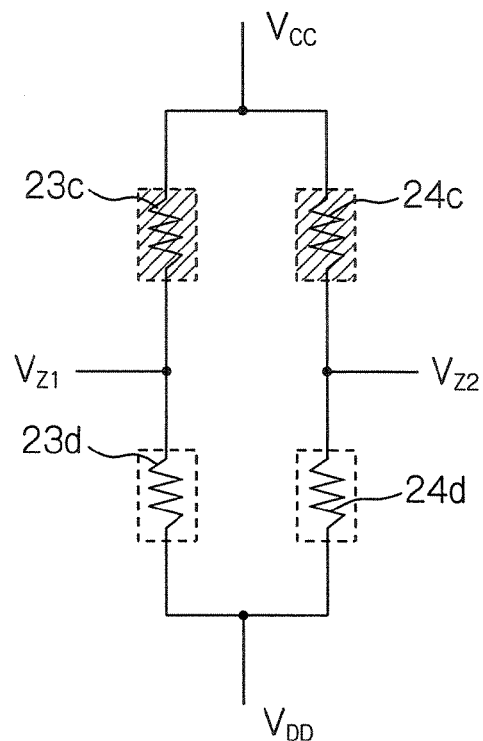
Figure 6C:
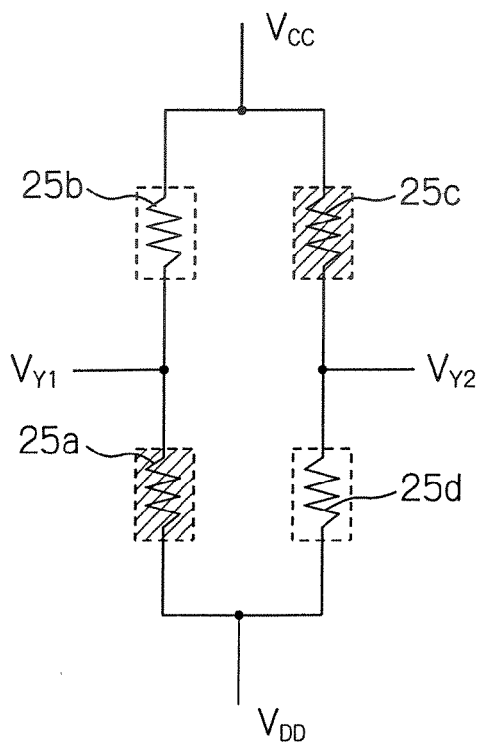

FIG. 4 schematically illustrates electrical connections on the wiring board 20a and structures of the magnetic filed detection sensors 23-25, FIG. 5 illustrates electrical connection structures of the wiring board 20a and the magnetic filed detection sensors 23-25, and FIGS. 6a, 6b and 6c show equivalent circuit diagrams of the acceleration sensor.

As illustrated in these figures, in the first magnetic field detection sensor 23 for detecting accelerations in the X-axis and the Z-axis directions, two pairs of or four spin valve GMR elements 23a, 23b, 23c and 23d are formed in parallel with each other. Each of the spin valve GMR elements 23a to 23d has a linear section running along a direction (Y-axis direction) perpendicular to the X-axis. The spin valve GMR elements 23a and 23b constitute one pair and, in this embodiment, they are connected in series with each other. Both ends of the serially connected elements 23a and 23b are electrically connected to power supply terminal electrodes $T_{VCC}$ and $T_{VDD}$, respectively. The central point between the elements 23a and 23b is electrically connected to a signal output terminal $T_{X1}$. The spin valve GMR elements 23c and 23d also constitute one pair and, in this embodiment, they are connected in series with each other. Both ends of the serially connected elements 23c and 23d are electrically connected to the power supply terminal electrodes $T_{VCC}$ and $T_{VDD}$, respectively. The central point between the elements 23c and 23d is electrically connected to a signal output terminal $T_{Z1}$.

Each of the spin valve GMR elements 23a, 23b, 23c and 23d has a multi-layered structure mainly consisting of a magnetization fixed layer constituted by a pin layer of an anti-ferromagnetic material and a pinned layer of a ferromagnetic material, a nonmagnetic space layer, and a magnetization free layer (free layer) of a ferromagnetic material. The magnetization of the pinned layer of each element is fixed in the same direction perpendicular to a running direction of the free layer. Namely, in the first magnetic field detection sensor 23, all the pinned layers of the spin valve GMR elements 23a, 23b, 23c and 23d are fixed in the same direction that is the X-axis direction.

Figure 7:
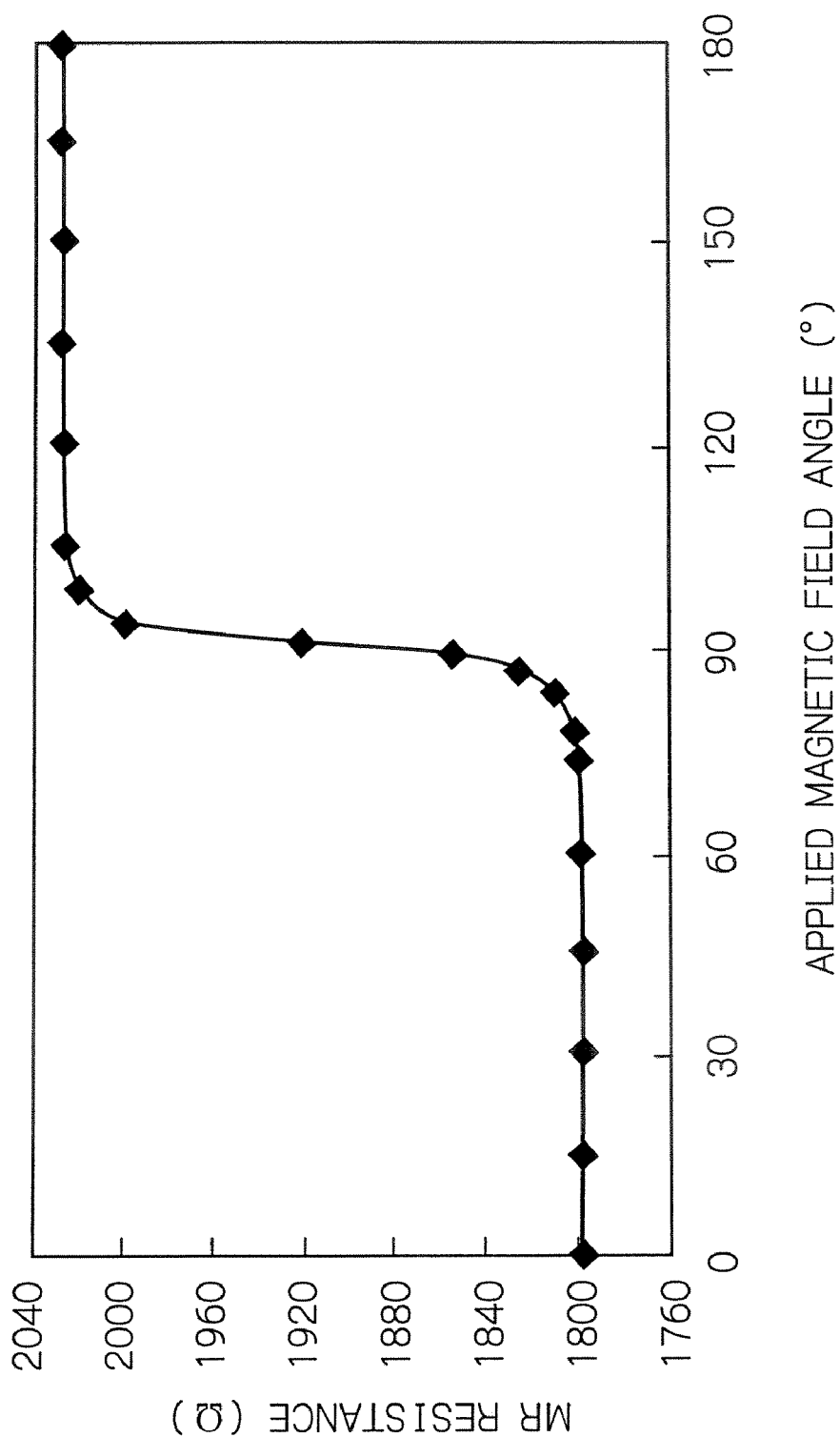
FIG. 7 is a view illustrating characteristics of an MR resistance variation versus an applied magnetic field angle with respect to a lamination plane of a spin valve GMR element.

FIG. 7 illustrates characteristics of the MR resistance variation versus the applied magnetic field angle with respect to the lamination plane of the spin valve GMR element. In the figure, the lateral axis represents an angle (degrees) between the applied magnetic field or the bias magnetic field and the direction along which the free layer runs, that is a direction perpendicular to the magnetization direction, and the longitudinal axis represents an MR resistance ($\Omega$).

As will be noted from the figure, the MR resistance of the spin valve GMR element will greatly change depending upon a slight change near 90 degrees of angle in the bias magnetic field. Because the small angle change $\theta$ of the bias magnetic field corresponds to 90 degrees $\pm\theta$, the small inclination of the magnetic field generation member with weight, that is, the pair of the permanent magnets is extracted as a change in MR resistance. This change in MR resistance indicates not only the amount of angle change but also positive and negative directions of angle change.

The bias magnetic fields respectively applied to the pair of spin valve GMR elements 23a and 23b connected in series with each other are in the directions substantially opposite to each other. Thus, the magnetization directions of the respective pinned layers in these spin valve GMR elements 23a and 23b are fixed to the same direction. The bias magnetic fields in the directions opposite to each other are obtained because a closed magnetic loop is formed by the pair of permanent magnets $22a_1$, and $22a_2$ and the pair of spin valve GMR elements 23a and 23b are arranged in the respective paths of the closed magnetic loop, through which magnetic fields flow in the directions opposite to each other. In this case, the center of the magnetic circuit that constitutes the closed magnetic loop is located on the centerline between the pair of spin valve GMR elements 23a and 23b.

To the pair of spin valve GMR elements 23c and 23d connected in series with each other, the same bias magnetic fields in the directions substantially opposite to each other are applied and the magnetization directions of the respective pinned layers in these spin valve GMR elements 23c and 23d are fixed to the same direction. In this case, also, the center of the magnetic circuit that constitutes the closed magnetic loop is located on the centerline between the pair of spin valve GMR elements 23c and 23d.

Since the magnetization directions of the respective pinned layers in the pair of spin valve GMR elements 23a and 23b and the pair of spin valve GMR elements 23c and 23d are fixed to the same direction by applying the opposite direction bias magnetic fields thereto, these four spin valve GMR elements 23a, 23b, 23c and 23d can be formed in a single chip resulting the acceleration sensor to more downsize.

In the second magnetic field detection sensor 24 for detecting accelerations in the X-axis and the Z-axis directions, two pairs of or four spin valve GMR elements 24a, 24b, 24c and 24d are also formed in parallel with each other. Each of the spin valve GMR elements 24a to 24d has a linear section running along a direction (Y-axis direction) perpendicular to the X-axis. The spin valve GMR elements 24a and 24b constitute one pair and, in this embodiment, they are connected in series with each other. Both ends of the serially connected elements 24a and 24b are electrically connected to power supply terminal electrodes $T_{VCC}$ and $T_{VDD}$, respectively. The central point between the elements 24a and 24b is electrically connected to a signal output terminal $T_{X2}$. The spin valve GMR elements 24c and 24d also constitute one pair and, in this embodiment, they are connected in series with each other. Both ends of the serially connected elements 24c and 24d are electrically connected to the power supply terminal electrodes $T_{VCC}$ and $T_{VDD}$, respectively. The central point between the elements 24c and 24d is electrically connected to a signal output terminal $T_{Z2}$.

Each of the spin valve GMR elements 24a, 24b, 24c and 24d has a multi-layered structure mainly consisting of a magnetization fixed layer constituted by a pin layer of an antiferromagnetic material and a pinned layer of a ferromagnetic material, a nonmagnetic space layer, and a magnetization free layer (free layer) of a ferromagnetic material. The magnetization of the pinned layer of each element is fixed in the same direction perpendicular to a running direction of the free layer. Namely, in the second magnetic field detection sensor 24, all the pinned layers of the spin valve GMR elements 24a, 24b, 24c and 24d are fixed in the same direction that is the X-axis direction.

The bias magnetic fields respectively applied to the pair of spin valve GMR elements 24a and 24b connected in series with each other are in the directions substantially opposite to each other. Thus, the magnetization directions of the respective pinned layers in these spin valve GMR elements 24a and 24b are fixed to the same direction. The bias magnetic fields in the directions opposite to each other are obtained because a closed magnetic loop is formed by the pair of permanent magnets $22b_1$, and $22b_2$ and the pair of spin valve GMR elements 24a and 24b are arranged in the respective paths of the closed magnetic loop, through which magnetic fields flow in the directions opposite to each other. In this case, the center of the magnetic circuit that constitutes the closed magnetic loop is located on the centerline between the pair of spin valve GMR elements 24a and 24b.

To the pair of spin valve GMR elements 24c and 24d connected in series with each other, the same bias magnetic fields in the directions substantially opposite to each other are applied and the magnetization directions of the respective pinned layers in these spin valve GMR elements 24c and 24d are fixed to the same direction. In this case, also, the center of the magnetic circuit that constitutes the closed magnetic loop is located on the centerline between the pair of spin valve GMR elements 24c and 24d.

Since the magnetization directions of the respective pinned layers in the pair of spin valve GMR elements 24a and 24b and the pair of spin valve GMR elements 24c and 24d are fixed to the same direction by applying the opposite direction bias magnetic fields thereto, these four spin valve GMR elements 24a, 24b, 24c and 24d can be formed in a single chip resulting the acceleration sensor to more downsize.

In the third magnetic field detection sensor 25 for detecting acceleration in the Y-axis direction, two pairs of or four spin valve GMR elements 25a, 25b, 25c and 25d are formed in parallel with each other. Each of the spin valve GMR elements 25a to 25d has a linear section running along a direction (X-axis direction) perpendicular to the Y-axis. The spin valve GMR elements 25a and 25b constitute one pair and, in this embodiment, they are connected in series with each other. Both ends of the serially connected elements 25a and 25b are electrically connected to power supply terminal electrodes $T_{VCC}$ and $T_{VDD}$, respectively. The central point between the elements 25a and 25b is electrically connected to a signal output terminal $T_{Y1}$. The spin valve GMR elements 25c and 25d also constitute one pair and, in this embodiment, they are connected in series with each other. Both ends of the serially connected elements 25c and 25d are electrically connected to the power supply terminal electrodes $T_{VCC}$ and $T_{VDD}$, respectively. The central point between the elements 25c and 25d is electrically connected to a signal output terminal $T_{Y2}$.

Each of the spin valve GMR elements 25a, 25b, 25c and 25d has a multi-layered structure mainly consisting of a magnetization fixed layer constituted by a pin layer of an antiferromagnetic material and a pinned layer of a ferromagnetic material, a nonmagnetic space layer, and a magnetization free layer (free layer) of a ferromagnetic material. The magnetization of the pinned layer of each element is fixed in the same direction perpendicular to a running direction of the free layer. Namely, in the third magnetic field detection sensor 25, all the pinned layers of the spin valve GMR elements 25a, 25b, 25c and 25d are fixed in the same direction that is the Y-axis direction.

The bias magnetic fields respectively applied to the pair of spin valve GMR elements 25a and 25b connected in series with each other are in the directions substantially opposite to each other. Thus, the magnetization directions of the respective pinned layers in these spin valve GMR elements 25a and 25b are fixed to the same direction. The bias magnetic fields in the directions opposite to each other are obtained because a closed magnetic loop is formed by the pair of permanent magnets $22c_1$, and $22c_2$ and the pair of spin valve GMR elements 25a and 25b are arranged in the respective paths of the closed magnetic loop, through which magnetic fields flow in the directions opposite to each other. In this case, the center of the magnetic circuit that constitutes the closed magnetic loop is located on the centerline between the pair of spin valve GMR elements 25a and 25b.

To the pair of spin valve GMR elements 25c and 25d connected in series with each other, the same bias magnetic fields in the directions substantially opposite to each other are applied and the magnetization directions of the respective pinned layers in these spin valve GMR elements 25c and 25d are fixed to the same direction. In this case, also, the center of the magnetic circuit that constitutes the closed magnetic loop is located on the centerline between the pair of spin valve GMR elements 25c and 25d.

Since the magnetization directions of the respective pinned layers in the pair of spin valve GMR elements 25a and 25b and the pair of spin valve GMR elements 25c and 25d are fixed to the same direction by applying the opposite direction bias magnetic fields thereto, these four spin valve GMR elements 25a, 25b, 25c and 25d can be formed in a single chip resulting the acceleration sensor to more downsize.

The power supply voltage $V_{CC}$-$V_{DD}$ is applied across the spin valve GMR elements 23a and 23b of the first magnetic field detection sensor 23, and a first X-axis acceleration signal $V_{X1}$ is derived from the signal output terminal $T_{X1}$ connected to the central point there between. Also, the power supply voltage $V_{CC}$-$V_{DD}$ is applied across the spin valve GMR elements 24b and 24a of the second magnetic field detection sensor 24, and a second X-axis acceleration signal $V_{X2}$ is derived from the signal output terminal $T_{X2}$ connected to the central point there between. Therefore, these spin valve GMR elements 23a, 23b, 24b and 24a are connected in full-bridge configuration as shown in FIG. 6a. The signals $V_{X1}$ and $V_{X2}$ from the respective signal output terminals $T_{X1}$ and $T_{X2}$ are differentially amplified to become an acceleration signal in the X-axis direction. This acceleration signal in the X-axis direction is provided only when the magnetic field generation member with weight 22a, that is the permanent magnets $22a_1$, and $22a_2$, and the magnetic field generation member with weight 22b, that is the permanent magnets $22b_1$ and $22b_2$, displace to the opposite directions to each other along the Z-axis direction due to the applied acceleration. When the magnetic field generation members with weights 22a and 22b displace together to the same direction, because the first and second X-axis acceleration signals $V_{X1}$ and $V_{X2}$ cancel each other out, no acceleration signal in the X-axis direction is provided.

The power supply voltage $V_{CC}$-$V_{DD}$ is applied across the spin valve GMR elements 23c and 23d of the first magnetic field detection sensor 23, and a first Z-axis acceleration signal $V_{Z1}$ is derived from the signal output terminal $T_{Z1}$ connected to the central point there between. Also, the power supply voltage $V_{CC}$-$V_{DD}$ is applied across the spin valve GMR elements 24c and 24d of the second magnetic field detection sensor 24, and a second Z-axis acceleration signal $V_{Z2}$ is derived from the signal output terminal $T_{Z2}$ connected to the central point there between. Therefore, these spin valve GMR elements 22c, 22d, 24c and 24d are connected in full-bridge configuration as shown in FIG. 6b. The signals $V_{Z1}$ and $V_{Z2}$ from the respective signal output terminals $T_{Z1}$ and $T_{Z2}$ are differentially amplified to become an acceleration signal in the Z-axis direction. This acceleration signal in the Z-axis direction is provided only when the magnetic field generation member with weight 22a, that is the permanent magnets $22a_1$ and $22a_2$, and the magnetic field generation member with weight 22b, that is the permanent magnets $22b_1$ and $22b_2$, displace together to the same direction along the Z-axis direction due to the applied acceleration. When the magnetic field generation members with weights 22a and 22b displace to the opposite directions to each other, because the first and second Z-axis acceleration signals $V_{Z1}$ and $V_{Z2}$ cancel each other out, no acceleration signal in the Z-axis direction is provided.

The power supply voltage $V_{CC}$-$V_{DD}$ is applied across the spin valve GMR elements 25b and 25a of the third magnetic field detection sensor 25, and a first Y-axis acceleration signal $V_{Y1}$ is derived from the signal output terminal $T_{Y1}$ connected to the central point there between. Also, the power supply voltage $V_{CC}$-$V_{DD}$ is applied across the spin valve GMR elements 25c and 25d of the third magnetic field detection sensor 25, and a second Y-axis acceleration signal $V_{Y2}$ is derived from the signal output terminal $T_{Y2}$ connected to the central point there between. Therefore, these spin valve GMR elements 25a, 25b, 25c and 25d of the third magnetic field detection sensor 25 are connected in full-bridge configuration as shown in FIG. 6c. The signals $V_{Y1}$ and $V_{Y2}$ from the respective signal output terminals $T_{Y1}$ and $T_{Y2}$ are differentially amplified to become an acceleration signal in the Y-axis direction. This acceleration signal in the Y-axis direction is provided when the magnetic field generation member with weight 22c, that is the permanent magnets $22c_1$ and $22c_2$ displaces along the Z-axis direction due to the applied acceleration.

Hereinafter, structures and operations of the spring member 21 of this embodiment will be described in detail.

FIGS. 8a, 8b and 8c illustrate fundamental operations of a strip-shaped plate spring of the spring member according to the present invention.

In FIG. 8a, which shows a state where no external force is applied, reference numeral 80 denotes the strip-shaped plate spring, 81 denotes a bending center or fulcrum located at one end of the strip-shaped plate spring 80, and 82 denotes a weight member fixed to the other end of the strip-shaped plate spring 80, which is separated from the bending center 81. In the following description, a direction perpendicular to the surface of the strip-shaped plate spring 80 is defined as a bending direction and a longitudinal direction of the strip-shaped plate spring 80 is defined as a length direction as shown in FIG. 8a.

When an external force in the bending direction is applied as shown in FIG. 8b and also when an external force in the length direction is applied as shown in FIG. 8c, the strip-shaped plate spring 80 produces bending stress to displace the other end thereof and the weight member 82 in the bending direction.

Figure 9A:
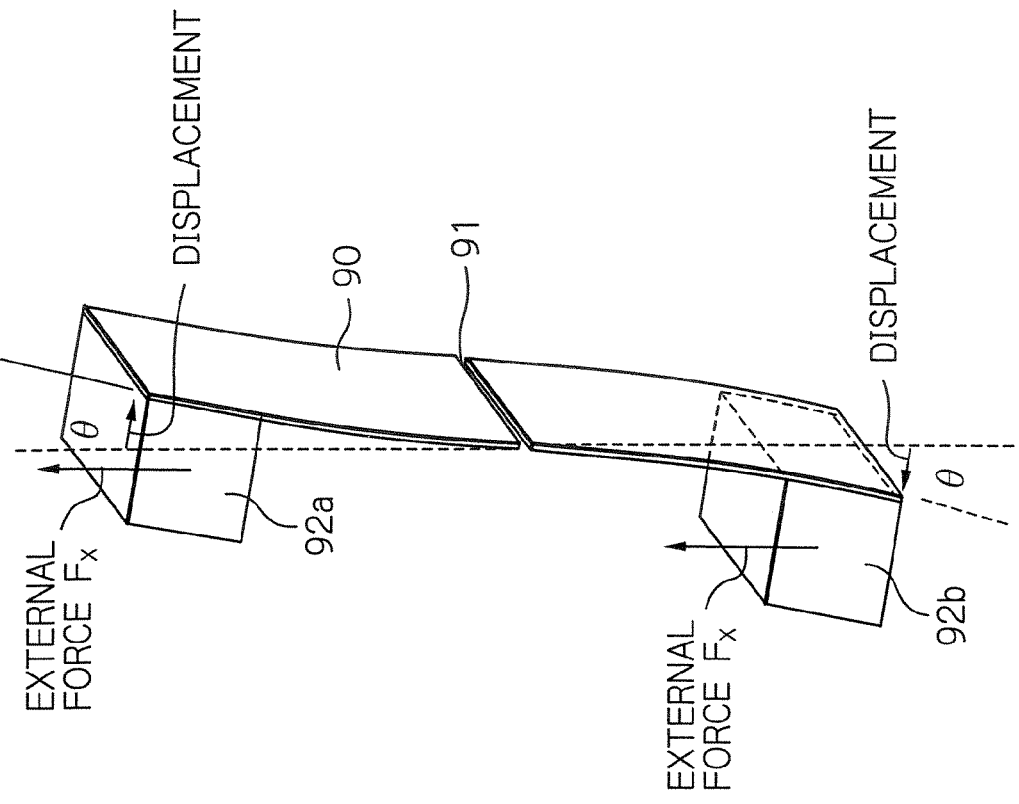
FIGS. 9a and 9b are oblique views illustrating operations of a strip-shaped plate spring having a fulcrum at its center and weight members at its both end sections.
Figure 9B:
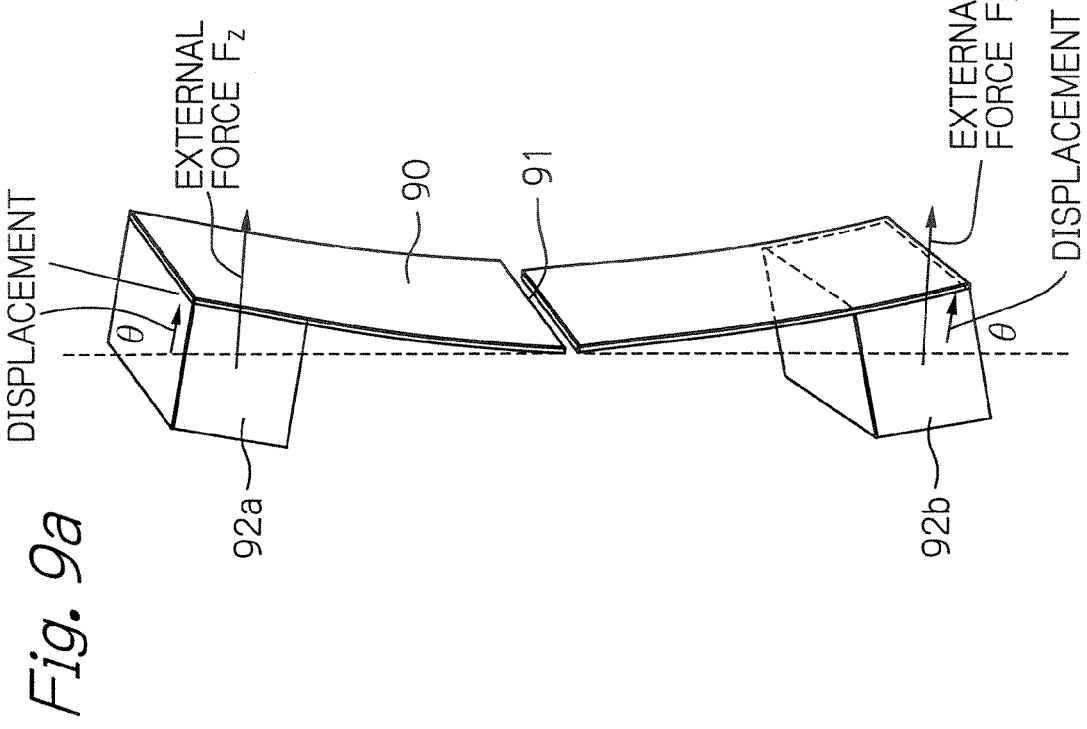

FIGS. 9a and 9b illustrate operations of a strip-shaped plate spring 90 with two strip-shaped plate springs shown in FIGS. 8a-8c developed from their bending centers to opposite sides, in other words, the strip-shaped plate spring 90 having a fulcrum 91 at its center and both end sections on which weight members 92a and 92b are attached, respectively.

When an external force $F_Z$ in the bending direction is applied as shown in FIG. 9a, the both end sections of the strip-shaped plate spring 90 and the weight members 92a and 92b displace together in the same bending direction. On the other hand, when an external force $F_X$ in the length direction is applied as shown in FIG. 9b, the end sections of the strip-shaped plate spring 90 and the weight members 92a and 92b displace in the opposite bending directions each other. If the external force $F_Z$ of FIG. 9a and the external force $F_X$ of FIG. 9b have the relationship of $|F_Z|=|F_X|$, displacement amounts of the weight members 92a and 92b become equal. The displacement amounts of the weight members 92a and 92b are proportional to displacement angles θ of the weight members 92a and 92b. In case that the weight members are formed by permanent magnets for generating magnetic fields, the spin valve GMR elements can detect the displacement angles θ to know the applied external force.

Figure 10A:
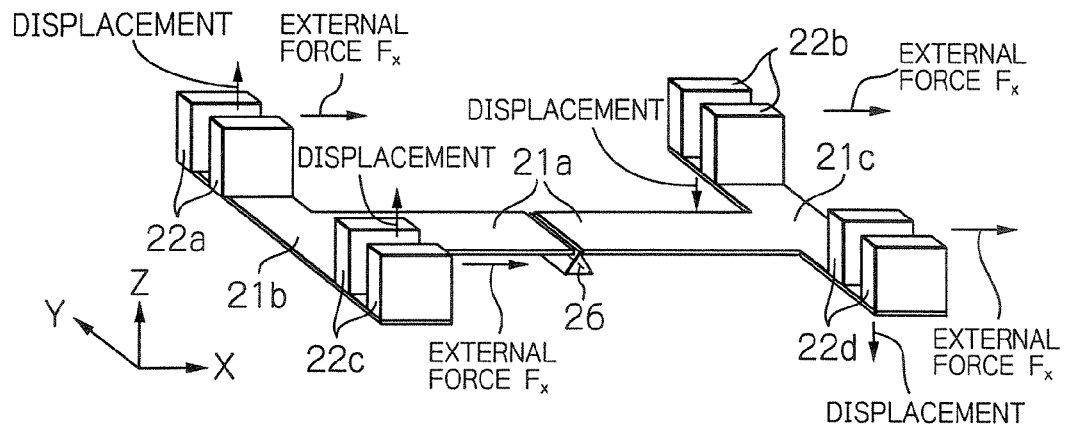
FIGS. 10a, 10b and 10c are oblique views illustrating operations of the spring member shown in FIG. 2.
Figure 10B:
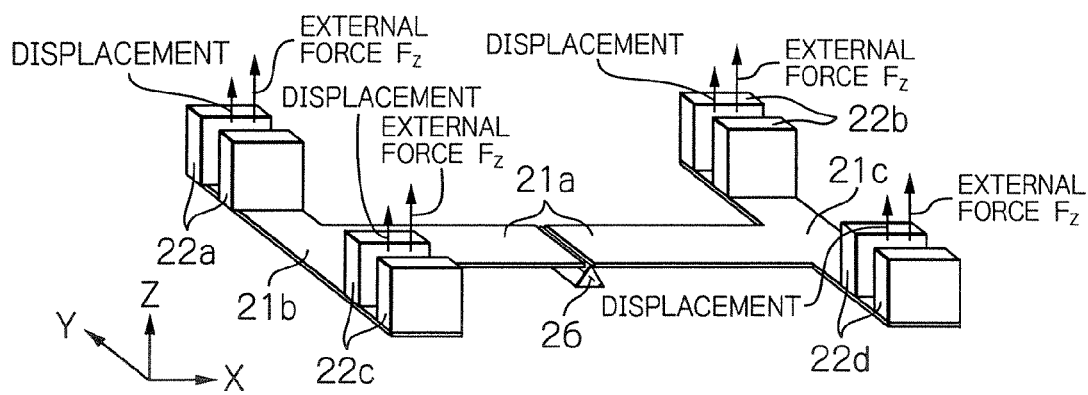
Figure 10C:
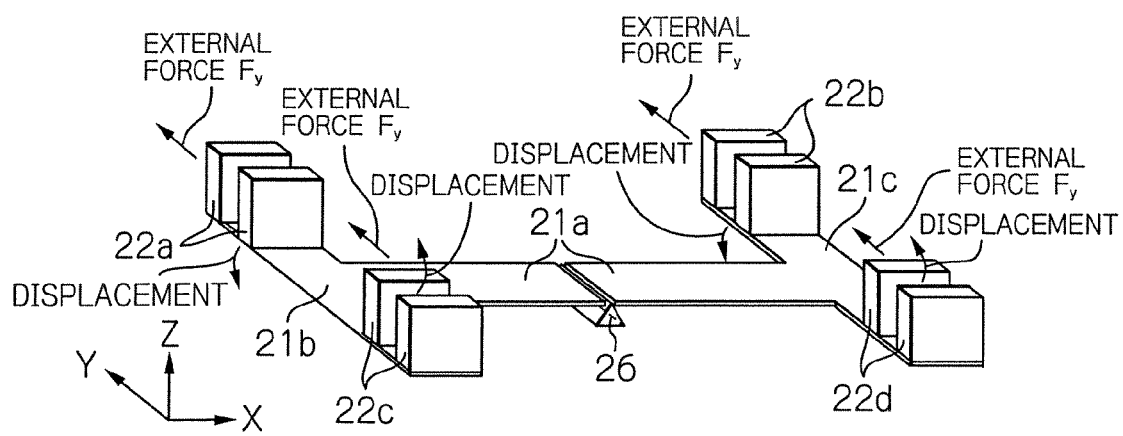

FIGS. 10a, 10b and 10c illustrate operations of the spring member in this embodiment. In these figures, although the running directions of the magnetic field generation members with weights 22c and 22d are shown in different directions from these in this embodiment, the operations of the spring member are the same.

When an external force $F_X$ along the X-axis direction is applied as shown in FIG. 10a, the first strip-shaped plate spring or main spring 21a and the second strip-shaped plate springs or sub-springs 21b and 21c produce bending stresses together to displace them in the bending direction to reach balance. In this case, the displaced directions of the magnetic field generation members with weights 22a and 22c and the magnetic field generation members with weights 22b and 22d are opposite directions each other. When an external force $F_Z$ along the Z-axis direction is applied as shown in FIG. 10b, the first strip-shaped plate spring or main spring 21a and the second strip-shaped plate springs or sub-springs 21b and 21c produce bending stresses together to displace them in the bending direction to reach balance. In this case, the displaced directions of the magnetic field generation members with weights 22a and 22c and the magnetic field generation members with weights 22b and 22d are the same direction. When an external force $F_Y$ along the Y-axis direction is applied as shown in FIG. 10c, the first strip-shaped plate spring or main spring 21a produces a twisting stress rotating around the center of its length direction and the second strip-shaped plate springs or sub-springs 21b and 21c produce bending stresses to displace them in the rotational direction around the center of the length direction of the main spring to reach balance. In this case, the displaced directions of the magnetic field generation members with weights 22a and 22b and the magnetic field generation members with weights 22c and 22d are opposite directions each other.

When an external force $F_X$ along the X-axis direction is applied and the magnetic field generation members with weights 22a and 22c and the magnetic field generation members with weights 22b and 22d displace in the bending direction of the main spring as aforementioned, angles of the bias magnetic fields applied to the spin valve GMR elements 23a and 23b and the spin valve GMR elements 24b and 24a accordingly change to the same direction. Thus, an added differential output of the first X-axis acceleration signal $V_{X1}$ and the second X-axis acceleration signal $V_{X2}$ is derived to provide it as an acceleration signal in the X-axis direction. In this case, since the first Z-axis acceleration signal $V_{Z1}$ and the second Z-axis acceleration signal $V_{Z2}$ cancel each other out, no acceleration signal in the Z-axis direction is provided. Also, in this case, because the bias magnetic field angle changes along the running direction of the free layers of the spin valve GMR elements 25d, 25b, 25c and 25a, the first Y-axis acceleration signal $V_{Y1}$ and the second Y-axis acceleration signal $V_{Y2}$ are not produced and therefore no acceleration signal in the Y-axis direction is provided.

When an external force $F_Z$ along the Z-axis direction is applied and the magnetic field generation members with weights 22a and 22c and the magnetic field generation members with weights 22b and 22d displace in the bending direction of the main spring as aforementioned, angles of the bias magnetic fields applied to the spin valve GMR elements 22c and 22d and the spin valve GMR elements 24c and 24d accordingly change to the opposite directions. Thus, an added differential output of the first Z-axis acceleration signal $V_{Z1}$ and the second Z-axis acceleration signal $V_{Z2}$ is derived to provide it as an acceleration signal in the Z-axis direction. In this case, since the first X-axis acceleration signal $V_{X1}$ and the second X-axis acceleration signal $V_{X2}$ cancel each other out, no acceleration signal in the X-axis direction is provided. Also, in this case, because the bias magnetic field angle changes along the running direction of the free layers of the spin valve GMR elements 25d, 25b, 25c and 25a, the first Y-axis acceleration signal $V_{Y1}$ and the second Y-axis acceleration signal $V_{Y2}$ are not produced and therefore no acceleration signal in the Y-axis direction is provided.

When an external force $F_Y$ along the Y-axis direction is applied and the magnetic field generation members with weights 22a and 22c and the magnetic field generation members with weights 22b and 22d displace in the rotational direction around the center of the length direction of the main spring, angles of the bias magnetic fields applied to the spin valve GMR elements 25d, 25b, 25c and 25a accordingly change to the same direction. Thus, an added differential output of the first Y-axis acceleration signal $V_{Y1}$ and the second Y-axis acceleration signal $V_{Y2}$ is derived to provide it as an acceleration signal in the Y-axis direction. In this case, because the bias magnetic field angle changes along the running direction of the free layers of the spin valve GMR elements 23a-23d and 24a-24d, the first X-axis acceleration signal $V_{X1}$ and the second X-axis acceleration signal $V_{X2}$ and the first Z-axis acceleration signal $V_{Z1}$ and the second Z-axis acceleration signal $V_{Z2}$ are not produced, and therefore, no acceleration signal in the X-axis direction and no acceleration signal in the Z-axis direction are provided.

According to this embodiment, because the first strip-shaped plate spring or main spring 21a and the second strip-shaped plate springs or sub-springs 21b and 21c produce bending stresses together so as to displace them in the bending direction to reach balance, the spring member 21 can be configured to have an extremely small size, a large displacement amount and high sensitivity. Therefore, it is possible to provide an acceleration sensor that can expect highly sensitive detection of acceleration even though having an extremely miniaturized structure.

Also, according to this embodiment, since the four end sections of the spring member are formed in the same structure and shape, it is possible to provide an acceleration sensor with uniform sensitivity and detection directivity of any of the X-axis, Y-axis and Z-axis direction accelerations to be detected.

According to this embodiment, further, because utilized is bending function of the first strip-shaped plate spring 21a with the fulcrum at its center, on the both end sections of which the magnetic field generation members with weights are fixed, and because derived is a differential output between a partial output $V_{X1}$ or $V_{Z1}$ of the first magnetic field detection sensor 23 and a partial output $V_{X2}$ or $V_{Z2}$ of the second magnetic field detection sensor 24, it is possible to certainly separate and correctly derive acceleration components in the X-axis direction and the Z-axis direction. In addition, because utilized is twisting function of the first strip-shaped plate spring 21a and appropriately determined is the magnetic field sensing direction of the third magnetic field detection sensor 25, it is possible to certainly separate and correctly derive an acceleration component in the Y-axis direction.

Also, because the amount of and the positive and negative of acceleration in each of the Z-axis, X-axis and Y-axis directions can be sensed by only the three magnetic field detection sensors, the number of the magnetic field detection sensors can be decreased and also the structure of each sensor can be extremely simplified resulting the total size of the acceleration sensor to extremely miniaturize. Furthermore, because the spin valve GMR element is quite sensitive in magnetic field change, highly sensitive acceleration detection can be expected.

Still further, according to this embodiment, since the bias magnetic fields applied to the pair of spin valve GMR elements in each magnetic field detection sensor are in the directions opposite to each other, the magnetization directions of the respective pinned layers in these spin valve GMR elements are fixed to the same direction. Thus, two pairs of spin valve GMR elements, that is, four spin vale GMR elements can be formed in a single chip resulting the acceleration sensor to more downsize.

According to this embodiment, furthermore, because the pair of two permanent magnets provide the closed magnetic loop with widely spread magnetic field in the direction perpendicular to the lamination plane of the spin valve GMR element and the spin valve GMR element is arranged in this closed magnetic loop, only the minimum amount of magnetic field will leaked to the outside from the closed magnetic loop, that is the leakage of magnetic field will decrease, and enough bias magnetic filed will be applied to the spin valve GMR element. Therefore, even if the permanent magnet downsizes, stable and high sensitivity in acceleration detection can be obtained and also insensitivity to possible external electrical field and external magnetic field applied thereto can be expected.

According to this embodiment, further, because it is not necessary to form electrodes on the spring member and the magnetic field generation members with weights, the wiring structure can be simplified. Also, because of a low impedance, the acceleration sensor of this embodiment is relatively unaffected by external disturbance when compared with the piezo-electric type acceleration sensor and the electrostatic capacitance type acceleration sensor.

Figure 11:
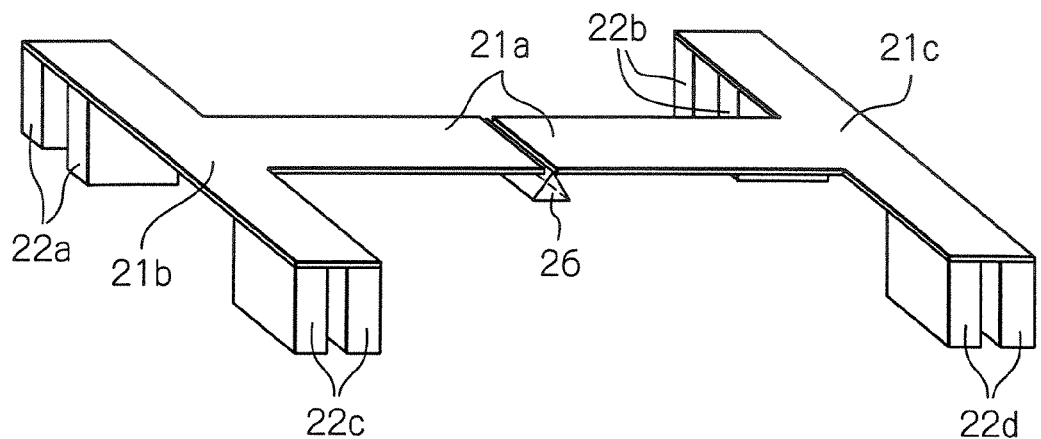
FIG. 11 is an oblique view diagrammatically illustrating structures of a spring member and magnetic field generation members with weights of an acceleration sensor as another embodiment according to the present invention.

FIG. 11 diagrammatically illustrates structures of a spring member and magnetic field generation members with weights of an acceleration sensor as another embodiment according to the present invention. Configuration of the acceleration sensor in this embodiment is the same as that of the embodiment shown in FIG. 2 except for that of the magnetic field generation members with weights. Therefore, in FIG. 11, the same reference numerals are used for the same elements as those in the embodiment of FIG. 2.

Structure of the spring member in this embodiment is the same as that in the embodiment of FIG. 2. This embodiment differs from the embodiment of FIG. 2 in that the magnetic field generation members with weights 22a-22d are fixed on magnetic field detection sensor-side surfaces of the weight support sections formed at the both end sections of the second strip-shaped plate springs 21b and 21c, respectively. Namely, in this embodiment, the magnetic field generation members with weights 22a-22d are attached on the opposite surfaces from that in the embodiment of FIG. 2. As will be noted, according to the present invention, the four magnetic field generation members with weights can be attached to any one of front and rear surfaces of the spring member.

Other configuration of the spring member and the magnetic field generation members with weights in this embodiment, and operations, functions and advantages of this embodiment are the same as those in the embodiment of FIG. 2.

Figure 12:
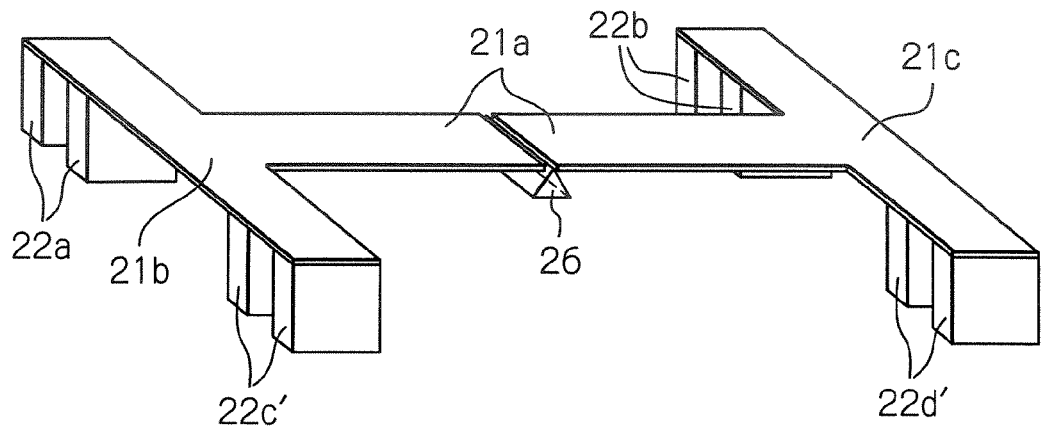
FIG. 12 is an oblique view diagrammatically illustrating structures of a spring member and magnetic field generation members with weights of an acceleration sensor as further embodiment according to the present invention.

FIG. 12 diagrammatically illustrates structures of a spring member and magnetic field generation members with weights of an acceleration sensor as further embodiment according to the present invention. Configuration of the acceleration sensor in this embodiment is the same as that of the embodiment shown in FIG. 2 except for that of the magnetic field generation members with weights. Therefore, in FIG. 12, the same reference numerals are used for the same elements as those in the embodiment of FIG. 2.

Structure of the spring member in this embodiment is the same as that in the embodiment of FIG. 2. This embodiment differs from the embodiment of FIG. 2 in that the magnetic field generation members with weights 22a, 22b, 22c' and 22d' are fixed on magnetic field detection sensor-side surfaces of the weight support sections formed at the both end sections of the second strip-shaped plate springs 21b and 21c, respectively, and that the length or running direction of the magnetic field generation members with weights 22c' and 22d' are different from that in the embodiment of FIG. 2. Namely, in this embodiment, the magnetic field generation members with weights 22a, 22b, 22c' and 22d' are attached on the opposite surfaces from that in the embodiment of FIG. 2 and the magnetic field generation members with weights 22c' and 22d' run along a different direction from that of the magnetic field generation members with weights 22c and 22d in the embodiment of FIG. 2. As will be noted, according to the present invention, the four magnetic field generation members with weights can be attached to any one of front and rear surfaces of the spring member. Also, according to the present invention, the running direction and the shape of the four magnetic field generation members with weights attached on the both end sections of the second strip-shaped plate springs 21b and 21c can differ from each other on condition that their weights are balanced to each other.

Other configuration of the spring member and the magnetic field generation members with weights in this embodiment, and operations, functions and advantages of this embodiment are the same as those in the embodiment of FIG. 2.

Figure 13:
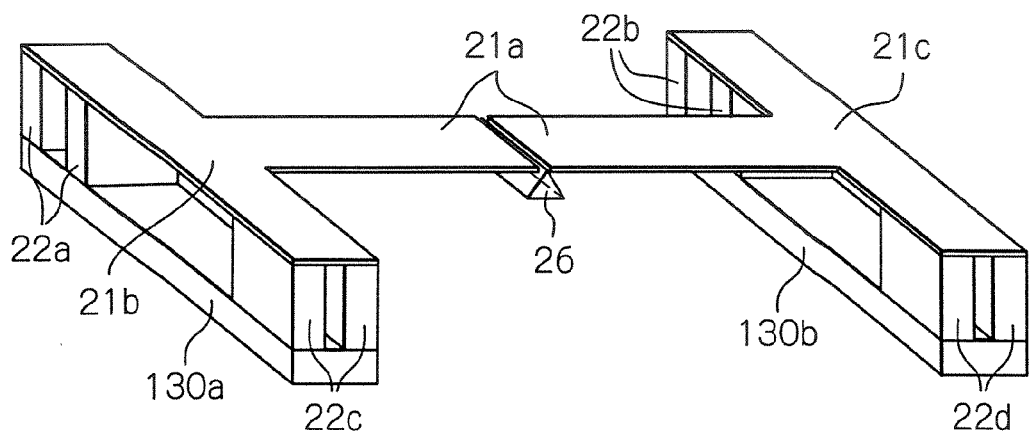
FIG. 13 is an oblique view diagrammatically illustrating structures of a spring member and magnetic field generation members with weights of an acceleration sensor as still further embodiment according to the present invention.

FIG. 13 diagrammatically illustrates structures of a spring member and magnetic field generation members with weights of an acceleration sensor as still further embodiment according to the present invention. Configuration of the acceleration sensor in this embodiment is the same as that of the embodiment shown in FIG. 2 except for that of the magnetic field generation members with weights. Therefore, in FIG. 13, the same reference numerals are used for the same elements as those in the embodiment of FIG. 2.

Structure of the spring member in this embodiment is the same as that in the embodiment of FIG. 2. This embodiment differs from the embodiment of FIG. 2 in that the magnetic field generation members with weights 22a-22d are fixed on magnetic field detection sensor-side surfaces of the weight support sections formed at the both end sections of the second strip-shaped plate springs 21b and 21c, respectively, and that the magnetic field generation members with weights 22a and 22c and the magnetic field generation members with weights 22b and 22d are connected each other by rigid strip-shaped support members 130a and 130b, respectively. Namely, in this embodiment, the magnetic field generation members with weights 22a-22d are attached to the opposite surfaces from that in the embodiment of FIG. 2, the magnetic field generation members with weights 22a and 22c are connected each other by the rigid strip-shaped support member 130a, and the magnetic field generation members with weights 22b and 22d are connected each other by the rigid strip-shaped support member 130b. As will be noted, according to the present invention, the four magnetic field generation members with weights can be attached to any one of front and rear surfaces of the spring member.

Because the strip-shaped support members 130a and 130b are fixed to the respective second strip-shaped plate springs 21b and 21c, these second strip-shaped plate springs 21b and 21c do not function as spring and therefore only the first strip-shaped plate spring 21a operates as spring. This first strip-shaped plate spring 21a produces a bending stress and a twisting stress in response to an external force applied to displace the magnetic field generation members with weights 22a-22d.

Other configuration of the spring member and the magnetic field generation members with weights in this embodiment, and operations, functions and advantages of this embodiment are the same as those in the embodiment of FIG. 2.

Figure 14:
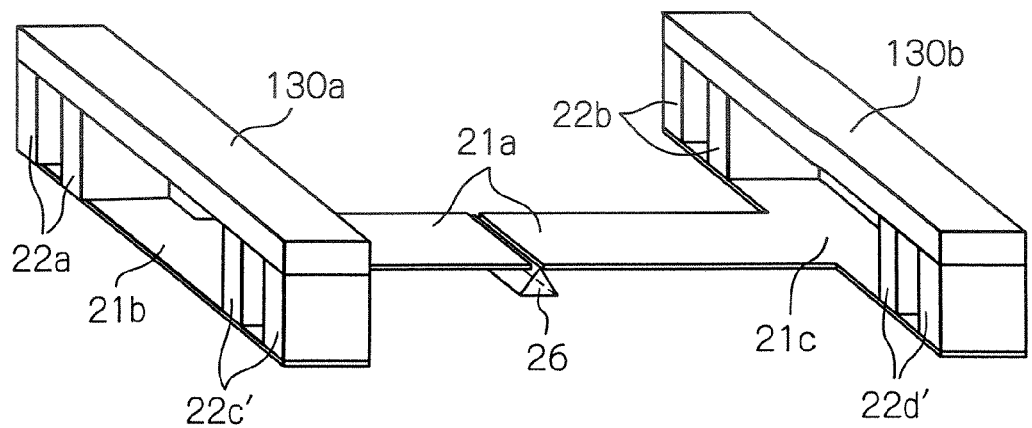
FIG. 14 is an oblique view diagrammatically illustrating structures of a spring member and magnetic field generation members with weights of an acceleration sensor as further embodiment according to the present invention.

FIG. 14 diagrammatically illustrates structures of a spring member and magnetic field generation members with weights of an acceleration sensor as further embodiment according to the present invention. Configuration of the acceleration sensor in this embodiment is the same as that of the embodiment shown in FIG. 2 except for that of the magnetic field generation members with weights. Therefore, in FIG. 14, the same reference numerals are used for the same elements as those in the embodiment of FIG. 2.

Structure of the spring member in this embodiment is the same as that in the embodiment of FIG. 2. This embodiment differs from the embodiment of FIG. 2 in that the length or running direction of the magnetic field generation members with weights 22c' and 22d' are different from that in the embodiment of FIG. 2, and that the magnetic field generation members with weights 22a and 22c' and the magnetic field generation members with weights 22b and 22d' are connected each other by rigid strip-shaped support members 130a and 130b, respectively. Namely, in this embodiment, the magnetic field generation members with weights 22c' and 22d' run along a different direction from that of the magnetic field generation members with weights 22c' and 22d' in the embodiment of FIG. 2, the magnetic field generation members with weights 22a and 22c' are connected each other by the rigid strip-shaped support member 130a, and the magnetic field generation members with weights 22b and 22d' are connected each other by the rigid strip-shaped support member 130b.

According to the present invention, the running direction and the shape of the four magnetic field generation members with weights attached to the both end sections of the second strip-shaped plate springs 21b and 21c can differ from each other on condition that their weights are balanced to each other. Because the strip-shaped support members 130a and 130b are fixed to the respective second strip-shaped plate springs 21b and 21c, these second strip-shaped plate springs 21b and 21c do not function as spring and therefore only the first strip-shaped plate spring 21a operates as spring. This first strip-shaped plate spring 21a produces a bending stress and a twisting stress in response to an external force applied to displace the magnetic field generation members with weights 22a, 22b, 22c' and 22d'.

Other configuration of the spring member and the magnetic field generation members with weights in this embodiment, and operations, functions and advantages of this embodiment are the same as those in the embodiment of FIG. 2.

Figure 15:
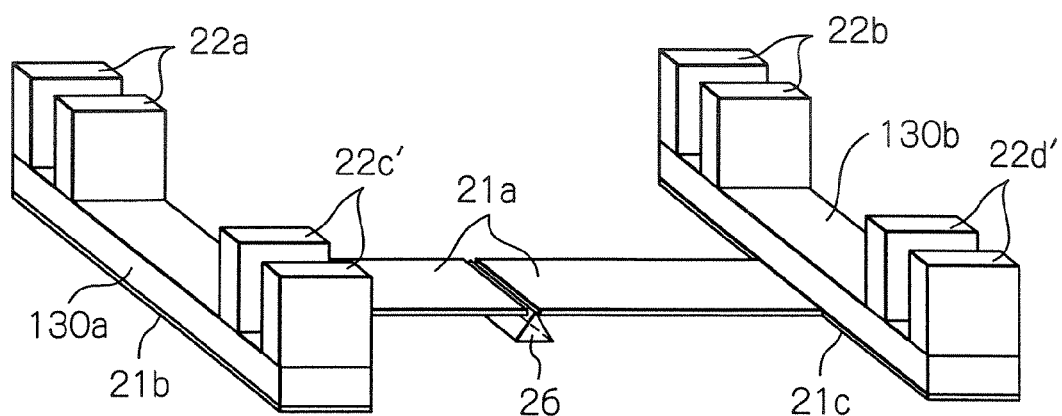
FIG. 15 is an oblique view diagrammatically illustrating structures of a spring member and magnetic field generation members with weights of an acceleration sensor as still further embodiment according to the present invention.

FIG. 15 diagrammatically illustrates structures of a spring member and magnetic field generation members with weights of an acceleration sensor as still further embodiment according to the present invention. Configuration of the acceleration sensor in this embodiment is the same as that of the embodiment shown in FIG. 2 except for that of the magnetic field generation members with weights. Therefore, in FIG. 15, the same reference numerals are used for the same elements as those in the embodiment of FIG. 2.

Structure of the spring member in this embodiment is the same as that in the embodiment of FIG. 2. This embodiment differs from the embodiment of FIG. 2 in that the length or running direction of the magnetic field generation members with weights 22c' and 22d' are different from that in the embodiment of FIG. 2, and that rigid strip-shaped support members 130a and 130b are fixed on the second strip-shaped plate springs 21b and 21c on which the magnetic field generation members with weights 22a, 22b, 22c' and 22d' are fixed and these magnetic field generation members with weights 22a and 22c' and the magnetic field generation members with weights 22b and 22d' are connected each other by the strip-shaped support members 130a and 130b, respectively. Namely, in this embodiment, the magnetic field generation members with weights 22c' and 22d' run along a different direction from that of the magnetic field generation members with weights 22c' and 22d' in the embodiment of FIG. 2, the magnetic field generation members with weights 22a and 22c' are connected each other by the rigid strip-shaped support member 130a attached on the second strip-shaped plate spring 21b, and the magnetic field generation members with weights 22b and 22d' are connected each other by the rigid strip-shaped support member 130b attached on the second strip-shaped plate spring 21c.

According to the present invention, the running direction and the shape of the four magnetic field generation members with weights attached to the both end sections of the second strip-shaped plate springs 21b and 21c can differ from each other on condition that their weights are balanced to each other. If this balance in weight is kept, the strip-shaped support members 130a and 130b may be attached to any portions of the second strip-shaped plate springs 21b and 21c. Because the strip-shaped support members 130a and 130b are fixed to the respective second strip-shaped plate springs 21b and 21c, these second strip-shaped plate springs 21b and 21c do not function as spring and therefore only the first strip-shaped plate spring 21a operates as spring. This first strip-shaped plate spring 21a produces a bending stress and a twisting stress in response to an external force applied to displace the magnetic field generation members with weights 22a, 22b, 22c' and 22d'.

Other configuration of the spring member and the magnetic field generation members with weights in this embodiment, and operations, functions and advantages of this embodiment are the same as those in the embodiment of FIG. 2.

Figure 16:
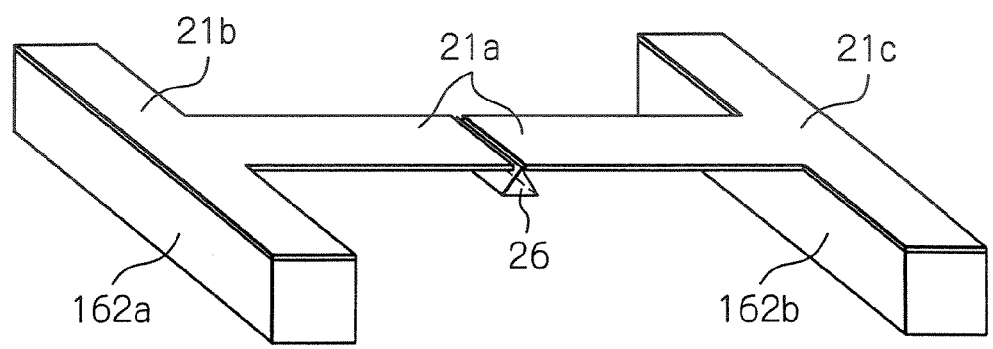
FIG. 16 is an oblique view diagrammatically illustrating structures of a spring member and magnetic field generation members with weights of an acceleration sensor as further embodiment according to the present invention.

FIG. 16 diagrammatically illustrates structures of a spring member and magnetic field generation members with weights of an acceleration sensor as further embodiment according to the present invention. Configuration of the acceleration sensor in this embodiment is the same as that of the embodiment shown in FIG. 2 except for that of the magnetic field generation members with weights. Therefore, in FIG. 16, the same reference numerals are used for the same elements as those in the embodiment of FIG. 2.

Structure of the spring member in this embodiment is the same as that in the embodiment of FIG. 2. This embodiment differs from the embodiment of FIG. 2 in that the magnetic field generation members with weights are consists of two magnetic field generation members with weights 162a and 162b, and that these magnetic field generation members with weights 162a and 162b are integrally fixed to the second strip-shaped plate springs 21b and 21c, respectively. Because the magnetic field generation members with weights 162a and 162b are integrally fixed to the respective second strip-shaped plate springs 21b and 21c, these second strip-shaped plate springs 21b and 21c do not function as spring and therefore only the first strip-shaped plate spring 21a operates as spring. This first strip-shaped plate spring 21a produces a bending stress and a twisting stress in response to an external force applied to displace the magnetic field generation members with weights 162a and 162b. Each of the magnetic field generation members with weights 162a and 162b has four permanent magnets and a weight member internally containing these permanent magnets.

Other configuration of the spring member and the magnetic field generation members with weights in this embodiment, and operations, functions and advantages of this embodiment are the same as those in the embodiment of FIG. 2.

Figure 17:
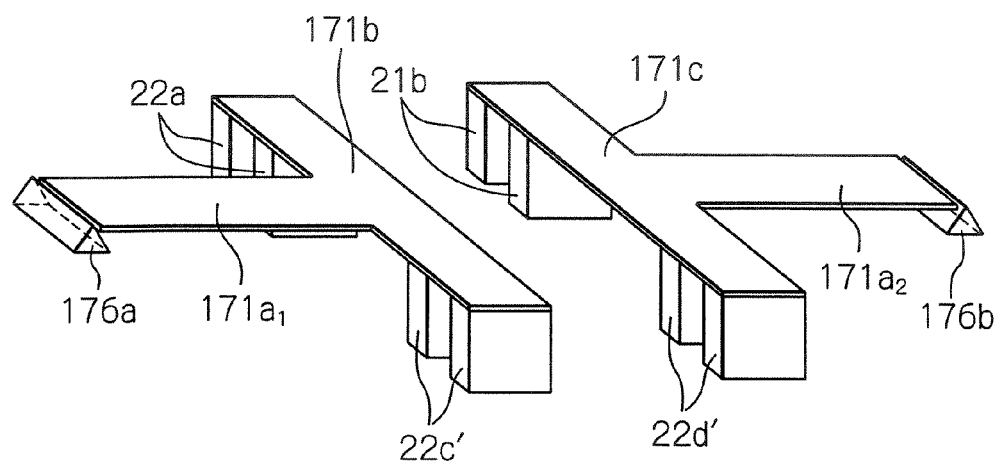
FIG. 17 is an oblique view diagrammatically illustrating structures of a spring member and magnetic field generation members with weights of an acceleration sensor as still further embodiment according to the present invention.

FIG. 17 diagrammatically illustrates structures of a spring member and magnetic field generation members with weights of an acceleration sensor as still further embodiment according to the present invention. Configuration of the acceleration sensor in this embodiment is the same as that of the embodiment shown in FIG. 2 except for that of the spring member and the magnetic field generation members with weights. Therefore, in FIG. 17, the same reference numerals are used for the same elements as those in the embodiment of FIG. 2.

In this embodiment, a first strip-shaped plate spring that functions as a main spring and produces a bending stress and/or a twisting stress in response to an externally applied force consists of separated two first strip-shaped plate springs $171a_1$ and $171a_2$. One ends of the first strip-shaped plate springs $171a_1$ and $171a_2$ constitute fulcrums and are fixed to one ends of the fulcrum members 176a and 176b, respectively. The other ends of the fulcrum members 176a and 176b are fixed to the wiring board. The centers of two second strip-shaped plate springs 171b and 171c that function as sub-springs and produce only a bending stress in response to an externally applied force are unitarily connected to the other ends of the first strip-shaped plate springs $171a_1$ and $171a_2$, respectively. The magnetic field generation members with weights 22a, 22b, 22c' and 22d' are fixed to the both end sections of the second strip-shaped plate springs 171b and 171c, respectively. Also, in this embodiment, the magnetic field generation members with weights 22a, 22b, 22c' and 22d' are fixed on magnetic field detection sensor-side surfaces of the weight support sections formed at the both end sections of the second strip-shaped plate springs 171b and 171c, respectively, and the length or running direction of the magnetic field generation members with weights 22c' and 22d' are different from that in the embodiment of FIG. 2. Namely, in this embodiment, the magnetic field generation members with weights 22a, 22b, 22c' and 22d' are attached on the opposite surfaces from that in the embodiment of FIG. 2 and the magnetic field generation members with weights 22c' and 22d' run along a different direction from that of the magnetic field generation members with weights 22c and 22d in the embodiment of FIG. 2. Even if the main spring is separated in two-way split as the spring member in this embodiment, the similar functions as that in the embodiment of FIG. 2 can be obtained. As will be noted, according to the present invention, the four magnetic field generation members with weights can be attached to any one of front and rear surfaces of the spring member. Also, according to the present invention, the running direction and the shape of the four magnetic field generation members with weights attached on the both end sections of the second strip-shaped plate springs 171b and 171c can differ from each other on condition that their weights are balanced to each other.

Other configuration of the spring member and the magnetic field generation members with weights in this embodiment, and operations, functions and advantages of this embodiment are the same as those in the embodiment of FIG. 2.

Figure 18:
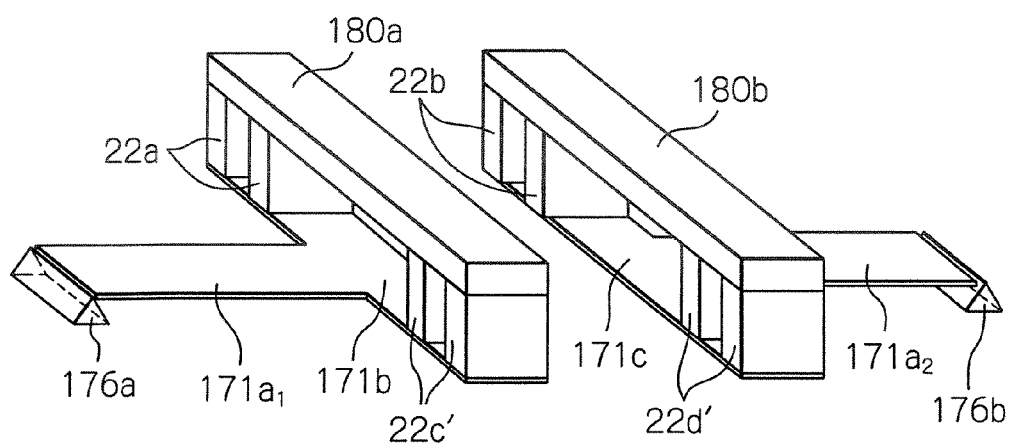
FIG. 18 is an oblique view diagrammatically illustrating structures of a spring member and magnetic field generation members with weights of an acceleration sensor as further embodiment according to the present invention.

FIG. 18 diagrammatically illustrates structures of a spring member and magnetic field generation members with weights of an acceleration sensor as further embodiment according to the present invention. Configuration of the acceleration sensor in this embodiment is the same as that of the embodiment shown in FIG. 2 except for that of the spring member and the magnetic field generation members with weights. Therefore, in FIG. 18, the same reference numerals are used for the same elements as those in the embodiment of FIG. 2.

In this embodiment, a first strip-shaped plate spring that functions as a main spring and produces a bending stress and/or a twisting stress in response to an externally applied force consists of separated two first strip-shaped plate springs $171a_1$ and $171a_2$. One ends of the first strip-shaped plate springs $171a_1$ and $171a_2$ constitute fulcrums and are fixed to one ends of the fulcrum members 176a and 176b, respectively. The other ends of the fulcrum members 176a and 176b are fixed to the wiring board. The centers of two second strip-shaped plate springs 171b and 171c that function as sub-springs and produce only a bending stress in response to an externally applied force are unitarily connected to the other ends of the first strip-shaped plate springs $171a_1$ and $171a_2$, respectively. The magnetic field generation members with weights 22a, 22b, 22c' and 22d' are fixed to the both end sections of the second strip-shaped plate springs 171b and 171c, respectively. Also, in this embodiment, the magnetic field generation members with weights 22a and 22c' and the magnetic field generation members with weights 22b and 22d' are connected each other by rigid strip-shaped support members 180a and 180b, respectively, and the length or running direction of the magnetic field generation members with weights 22c' and 22d' are different from that in the embodiment of FIG. 2. Namely, in this embodiment, the magnetic field generation members with weights 22a and 22c' are connected each other by the rigid strip-shaped support member 180a, the magnetic field generation members with weights 22b and 22d' are connected each other by the rigid strip-shaped support member 180b, and the magnetic field generation members with weights 22c' and 22d' run along a different direction from that of the magnetic field generation members with weights 22c and 22d in the embodiment of FIG. 2. Even if the main spring is separated in two-way split as the spring member in this embodiment, the similar functions as that in the embodiment of FIG. 2 can be obtained. Because the strip-shaped support members 180a and 180b are fixed to the respective second strip-shaped plate springs 171b and 171c, these second strip-shaped plate springs 171b and 171c do not function as spring and therefore only the first strip-shaped plate springs $171a_1$ and $171a_2$ operate as spring. These first strip-shaped plate springs $171a_1$ and $171a_2$ produce bending stresses and twisting stresses in response to an external force applied to displace the magnetic field generation members with weights 22a, 22b, 22c' and 22d'. Also, according to the present invention, the running direction and the shape of the four magnetic field generation members with weights attached on the both end sections of the second strip-shaped plate springs 171b and 171c can differ from each other on condition that their weights are balanced to each other.

Other configuration of the spring member and the magnetic field generation members with weights in this embodiment, and operations, functions and advantages of this embodiment are the same as those in the embodiment of FIG. 2.

Figure 19:
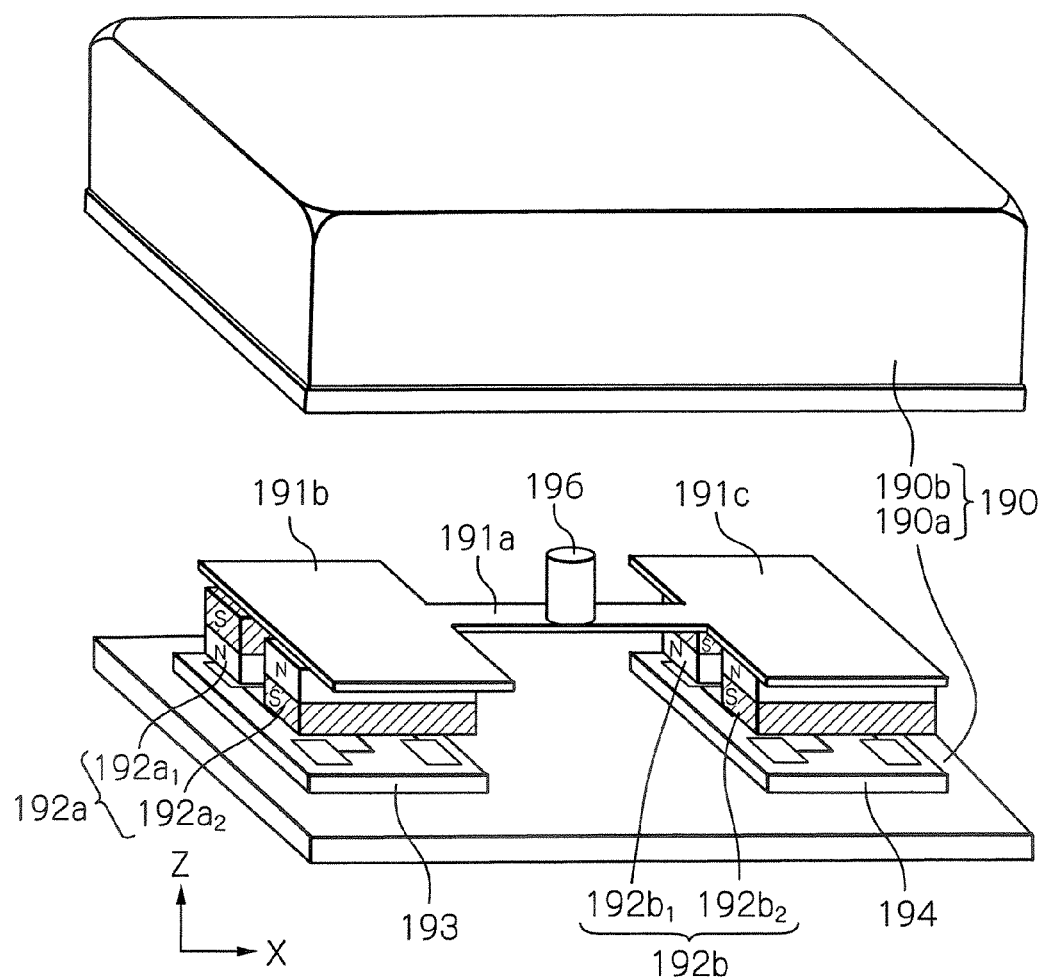
FIG. 19 is an exploded oblique view schematically illustrating a whole structure of an acceleration sensor as a still further embodiment according to the present invention.
Figure 20:
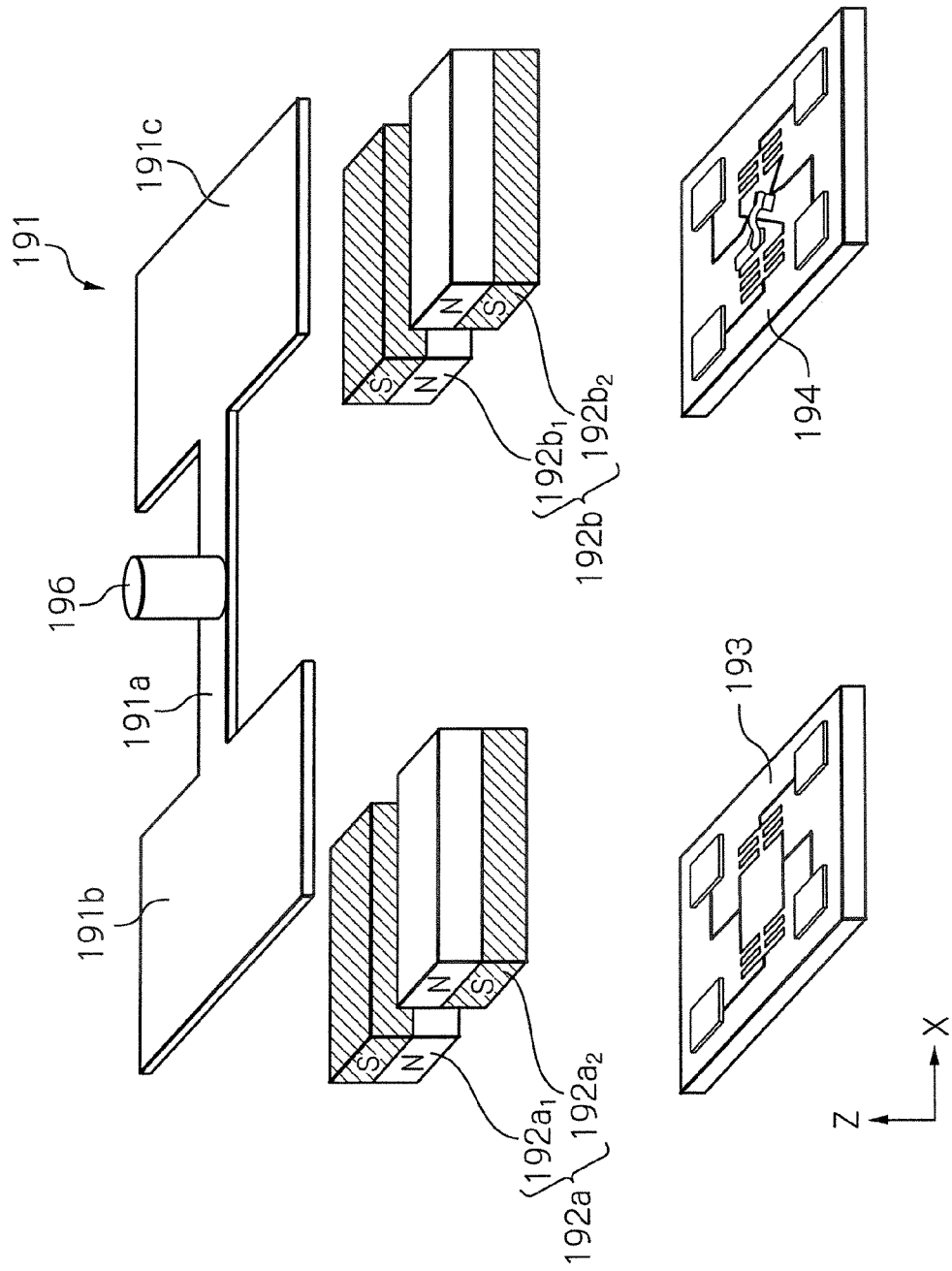
FIG. 20 is an exploded oblique view schematically illustrating structures of a spring member, magnetic field generation members with weights and magnetic filed detection sensors mounted in a housing member of the acceleration sensor shown in FIG. 19.

FIG. 19 schematically illustrates a whole structure of an acceleration sensor as a still further embodiment according to the present invention, and FIG. 20 illustrates structures of a spring member, magnetic field generation members with weights and magnetic field detection sensors mounted in a housing member of the acceleration sensor.

As shown in these figures, the acceleration sensor in this embodiment is used for detecting accelerations in two axes of X-axis direction and Z-axis, or Y-axis direction and Z-axis direction. In the following description, however, the acceleration sensor is for detecting accelerations in two axes of X-axis direction and Z-axis.

The acceleration sensor has a spring member 191, two magnetic field generation members with weights 192a and 192b, a first magnetic field detection sensor 193 for detecting the X-axis and the Z-axis accelerations, a second magnetic field detection sensor 194 for detecting the X-axis and the Z-axis accelerations, and a fulcrum member 196, accommodated in the housing member 190. The spring member 191 is integrally formed from a strip-shaped plate spring 191a and two weight-support sections 191b and 191c for supporting the two magnetic field generation members with weights 192a and 192b. The two magnetic field generation members with weights 192a and 192b have the same constitutions in dimension, in shape and in weight with each other.

The housing member 190 consists of a flat-shaped wiring board 190a with a substrate made of a resin material such as for example polyimide or BT resin and a wiring pattern (not shown) formed on and in the substrate, and a cover member 190b made of a magnetic metal material for covering and for sealing the wiring board 190a. In this embodiment, accelerations along two axes that are in X-axis direction and Z-axis direction can be detected by the two magnetic field detection sensors 193 and 194 mounted on a single plane of the wiring board 190a.

The spring member 191 is integrally formed from a thin-film metal plate made of for example NiFe, Ni or else, from a thin plate made of for example stainless steel, or from a thin resin plate made of for example polyimide, to have a shape shown in FIG. 20.

The strip-shaped plate spring 191a produces a bending stress in response to an externally applied force. The center of the strip-shaped plate spring 191a constitutes a fulcrum and is fixed to one end of the fulcrum member 196. The other end of the fulcrum member 196 is fixed to the cover member 190b. The both ends of the strip-shaped plate spring 191a are unitarily connected to the weight-support sections 191b and 191c that have the same shape to each other, respectively. In this embodiment, each of the weight-support sections 191b and 191c is shaped in a rectangular. However, in modifications, it may be formed in a circular shape or other shape.

The magnetic field generation members with weights 192a and 192b are fixed by an adhesive on one surfaces, that face to the magnetic field detection sensors, of the weight-support sections 191b and 191c of the spring member 191, respectively. These magnetic field generation members with weights 192a and 192b have two pairs of permanent magnets $192a_1$ and $192a_2$, and $192b_1$ and $192b_2$ for generating magnetic fields, respectively.

The first magnetic field detection sensor 193 for the X-axis and the Z-axis and the second magnetic field detection sensor 194 for the X-axis and the Z-axis are fixed by an adhesive on the wiring board 190a so as to face the two magnetic field generation members with weights 192a and 192b, respectively. Therefore, magnetic fields with angles that change depending upon the accelerations are applied to the first and second magnetic field detection sensors 193 an 194 from the magnetic field generation members with weights 192a and 192b, respectively.

The pair of permanent magnets $192a_1$ and $192a_2$ is made of a ferrite material and shaped in a rectangular parallelepiped shape running in parallel with each other along the X-axis direction. These permanent magnets $192a_1$ and $192a_2$ face to the first magnetic field detection sensor 193 for the X-axis and the Z-axis. The pair of permanent magnets $192a_1$ and $192a_2$ is arranged so that their surfaces facing the first magnetic field detection sensor 193 have different magnetic polarities with each other. A closed magnetic loop is formed by these permanent magnets $192a_1$ and $192a_2$. As will be mentioned later, spin valve GMR elements in the first magnetic field detection sensor 193 are arranged within this closed magnetic loop so that a magnetic field or bias field is applied in a direction substantially perpendicular to the lamination plan of these spin valve GMR elements.

The pair of permanent magnets $192b_1$ and $192b_2$ is made of a ferrite material and shaped in a rectangular parallelepiped shape running in parallel with each other along the X-axis direction. These permanent magnets $192b_1$ and $192b_2$ face to the second magnetic field detection sensor 194 for the X-axis and the Z-axis. The pair of permanent magnets $192b_1$ and $192b_2$ is arranged so that their surfaces facing the second magnetic field detection sensor 194 have different magnetic polarities with each other. A closed magnetic loop is formed by these permanent magnets $192b_1$ and $192b_2$. As will be mentioned later, spin valve GMR elements in the second magnetic field detection sensor 194 are arranged within this closed magnetic loop so that a magnetic field or bias field is applied in a direction substantially perpendicular to the lamination plan of these spin valve GMR elements.

Figure 21:
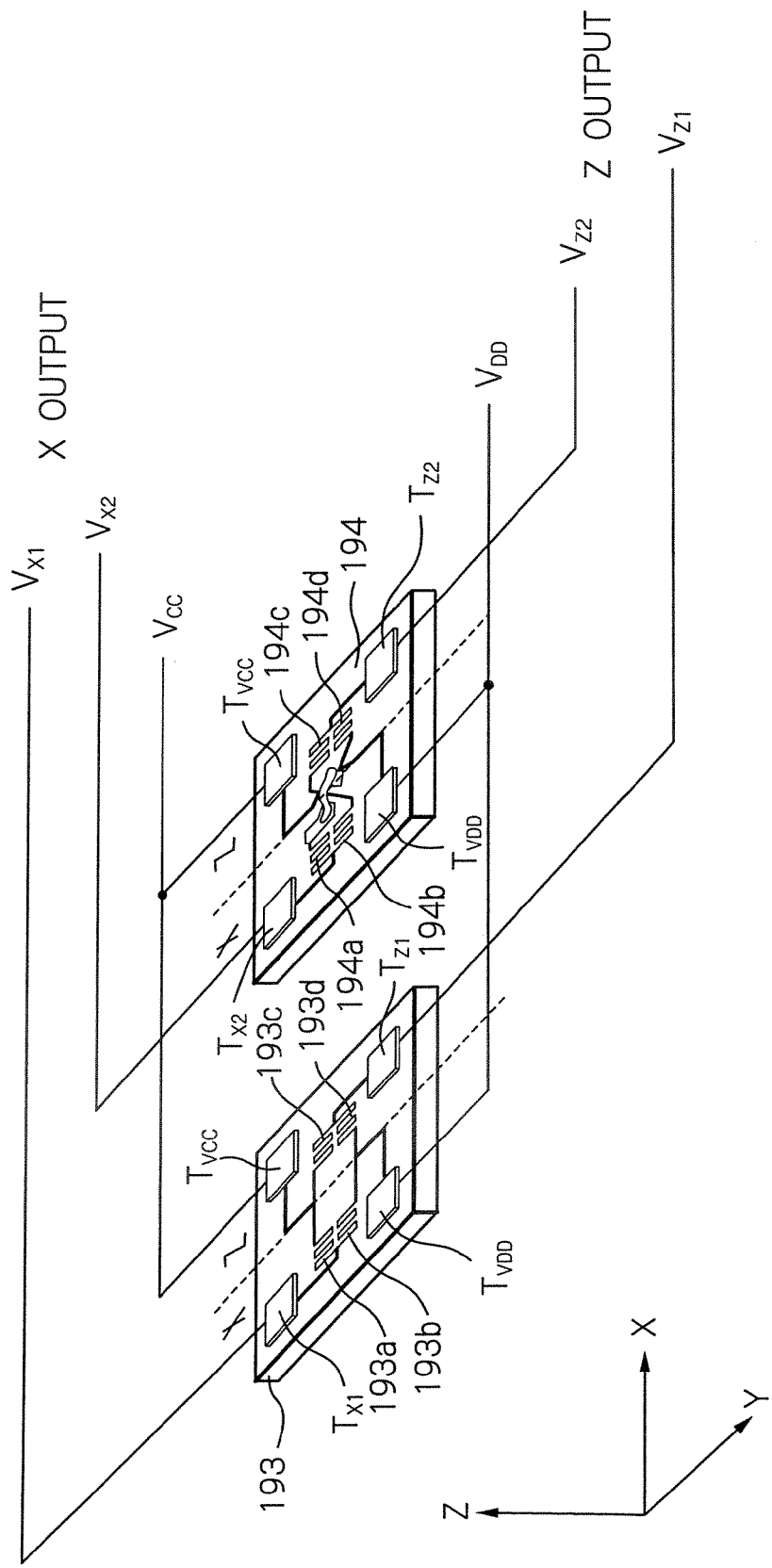
FIG. 21 is a view schematically illustrating electrical connections on a wiring board, and structures of the magnetic filed detection sensors in the acceleration sensor shown in FIG. 19.
Figure 22:
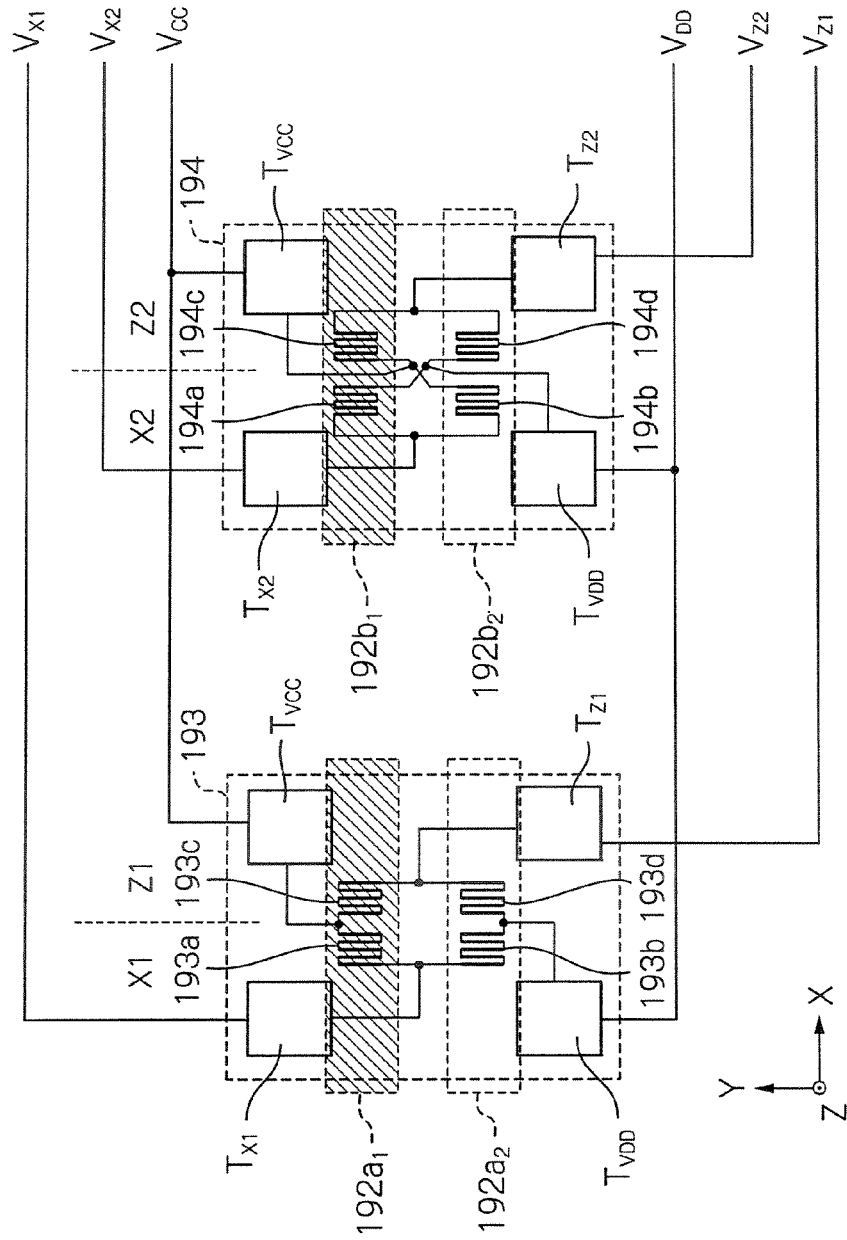
FIG. 22 is a circuit diagram illustrating electrical connection structures of the wiring board and the magnetic filed detection sensors in the acceleration sensor shown in FIG. 19.
Figure 23A:
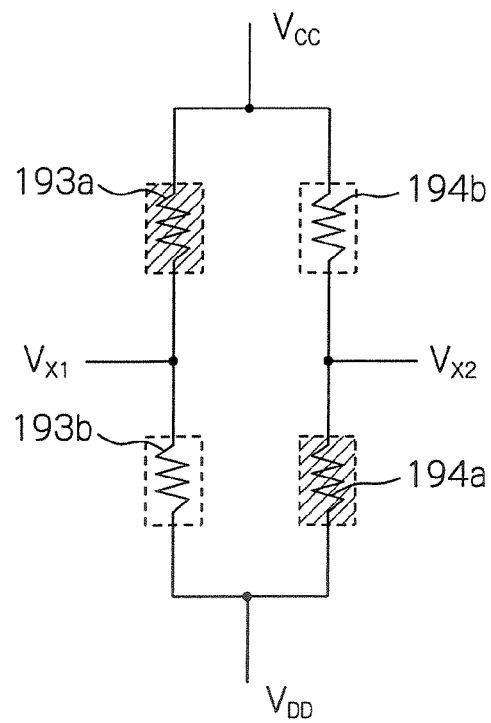
FIGS. 23a and 23b are equivalent circuit diagrams of the acceleration sensor shown in FIG. 19.

FIG. 21 schematically illustrates electrical connections on the wiring board 190a and structures of the magnetic filed detection sensors 193 and 194, FIG. 22 illustrates electrical connection structures of the wiring board 190a and the magnetic filed detection sensors 193 and 194, and FIGS. 23a an 23b show equivalent circuit diagrams of the acceleration sensor.

As illustrated in these figures, in the first magnetic field detection sensor 193 for detecting accelerations in the X-axis and the Z-axis directions, two pairs of or four spin valve GMR elements 193a, 193b, 193c and 193d are formed in parallel with each other. Each of the spin valve GMR elements 193a to 193d has a linear section running along a direction (Y-axis direction) perpendicular to the X-axis. The spin valve GMR elements 193a and 193b constitute one pair and, in this embodiment, they are connected in series with each other. Both ends of the serially connected elements 193a and 193b are electrically connected to power supply terminal electrodes $T_{VCC}$ and $T_{VDD}$, respectively. The central point between the elements 193a and 193b is electrically connected to a signal output terminal $T_{X1}$. The spin valve GMR elements 193c and 193d also constitute one pair and, in this embodiment, they are connected in series with each other. Both ends of the serially connected elements 193c and 193d are electrically connected to the power supply terminal electrodes $T_{VCC}$ and $T_{VDD}$, respectively. The central point between the elements 193c and 193d is electrically connected to a signal output terminal $T_{Z1}$.

Each of the spin valve GMR elements 193a, 193b, 193c and 193d has a multi-layered structure mainly consisting of a magnetization fixed layer constituted by a pin layer of an anti-ferromagnetic material and a pinned layer of a ferromagnetic material, a nonmagnetic space layer, and a magnetization free layer (free layer) of a ferromagnetic material. The magnetization of the pinned layer of each element is fixed in the same direction perpendicular to a running direction of the free layer. Namely, in the first magnetic field detection sensor 193, all the pinned layers of the spin valve GMR elements 193a, 193b, 193c and 193d are fixed in the same direction that is the X-axis direction.

The bias magnetic fields respectively applied to the pair of spin valve GMR elements 193a and 193b connected in series with each other are in the directions substantially opposite to each other. Thus, the magnetization directions of the respective pinned layers in these spin valve GMR elements 193a and 193b are fixed to the same direction. The bias magnetic fields in the directions opposite to each other are obtained because a closed magnetic loop is formed by the pair of permanent magnets $192a_1$ and $192a_2$ and the pair of spin valve GMR elements 193a and 193b are arranged in the respective paths of the closed magnetic loop, through which magnetic fields flow in the directions opposite to each other. In this case, the center of the magnetic circuit that constitutes the closed magnetic loop is located on the centerline between the pair of spin valve GMR elements 193a and 193b.

To the pair of spin valve GMR elements 193c and 193d connected in series with each other, the same bias magnetic fields in the directions substantially opposite to each other are applied and the magnetization directions of the respective pinned layers in these spin valve GMR elements 193c and 193d are fixed to the same direction. In this case, also, the center of the magnetic circuit that constitutes the closed magnetic loop is located on the centerline between the pair of spin valve GMR elements 193c and 193d.

Since the magnetization directions of the respective pinned layers in the pair of spin valve GMR elements 193a and 193b and the pair of spin valve GMR elements 193c and 193d are fixed to the same direction by applying the opposite direction bias magnetic fields thereto, these four spin valve GMR elements 193a, 193b, 193c and 193d can be formed in a single chip resulting the acceleration sensor to more downsize.

In the second magnetic field detection sensor 194 for detecting accelerations in the X-axis and the Z-axis directions, two pairs of or four spin valve GMR elements 194a, 194b, 194c and 194d are also formed in parallel with each other. Each of the spin valve GMR elements 194a to 194d has a linear section running along a direction (Y-axis direction) perpendicular to the X-axis. The spin valve GMR elements 194a and 194b constitute one pair and, in this embodiment, they are connected in series with each other. Both ends of the serially connected elements 194a and 194b are electrically connected to power supply terminal electrodes $T_{VCC}$ and $T_{VDD}$, respectively. The central point between the elements 194a and 194b is electrically connected to a signal output terminal $T_{X2}$. The spin valve GMR elements 194c and 194d also constitute one pair and, in this embodiment, they are connected in series with each other. Both ends of the serially connected elements 194c and 194d are electrically connected to the power supply terminal electrodes $T_{VCC}$ and $T_{VDD}$, respectively. The central point between the elements 194c and 194d is electrically connected to a signal output terminal $T_{Z2}$.

Each of the spin valve GMR elements 194a, 194b, 194c and 194d has a multi-layered structure mainly consisting of a magnetization fixed layer constituted by a pin layer of an anti-ferromagnetic material and a pinned layer of a ferromagnetic material, a nonmagnetic space layer, and a magnetization free layer (free layer) of a ferromagnetic material. The magnetization of the pinned layer of each element is fixed in the same direction perpendicular to a running direction of the free layer. Namely, in the second magnetic field detection sensor 194, all the pinned layers of the spin valve GMR elements 194a, 194b, 194c and 194d are fixed in the same direction that is the X-axis direction.

The bias magnetic fields respectively applied to the pair of spin valve GMR elements 194a and 194b connected in series with each other are in the directions substantially opposite to each other. Thus, the magnetization directions of the respective pinned layers in these spin valve GMR elements 194a and 194b are fixed to the same direction. The bias magnetic fields in the directions opposite to each other are obtained because a closed magnetic loop is formed by the pair of permanent magnets $192b_1$ and $192b_2$ and the pair of spin valve GMR elements 194a and 194b are arranged in the respective paths of the closed magnetic loop, through which magnetic fields flow in the directions opposite to each other. In this case, the center of the magnetic circuit that constitutes the closed magnetic loop is located on the centerline between the pair of spin valve GMR elements 194a and 194b.

To the pair of spin valve GMR elements 194c and 194d connected in series with each other, the same bias magnetic fields in the directions substantially opposite to each other are applied and the magnetization directions of the respective pinned layers in these spin valve GMR elements 194c and 194d are fixed to the same direction. In this case, also, the center of the magnetic circuit that constitutes the closed magnetic loop is located on the centerline between the pair of spin valve GMR elements 194c and 194d.

Since the magnetization directions of the respective pinned layers in the pair of spin valve GMR elements 194a and 194b and the pair of spin valve GMR elements 194c and 194d are fixed to the same direction by applying the opposite direction bias magnetic fields thereto, these four spin valve GMR elements 194a, 194b, 194c and 194d can be formed in a single chip resulting the acceleration sensor to more downsize.

The power supply voltage $V_{CC}$-$V_{DD}$ is applied across the spin valve GMR elements 193a and 193b of the first magnetic field detection sensor 193, and a first X-axis acceleration signal $V_{X1}$ is derived from the signal output terminal $T_{X1}$ connected to the central point there between. Also, the power supply voltage $V_{CC}$-$V_{DD}$ is applied across the spin valve GMR elements 194b and 194a of the second magnetic field detection sensor 194, and a second X-axis acceleration signal $V_{X2}$ is derived from the signal output terminal $T_{X2}$ connected to the central point there between. Therefore, these spin valve GMR elements 193a, 193b, 194b and 194a are connected in full-bridge configuration as shown in FIG. 23a. The signals $V_{X1}$ and $V_{X2}$ from the respective signal output terminals $T_{X1}$, and $T_{X2}$ are differentially amplified to become an acceleration signal in the X-axis direction. This acceleration signal in the X-axis direction is provided only when the magnetic field generation member with weight 192a, that is the permanent magnets $192a_1$ and $192a_2$, and the magnetic field generation member with weight 192b, that is the permanent magnets $192b_1$ and $192b_2$, displace to the opposite directions to each other along the Z-axis direction due to the applied acceleration. When the magnetic field generation members with weights 192a and 192b displace together to the same direction, because the first and second X-axis acceleration signals $V_{X1}$ and $V_{X2}$ cancel each other out, no acceleration signal in the X-axis direction is provided.

Figure 23B:
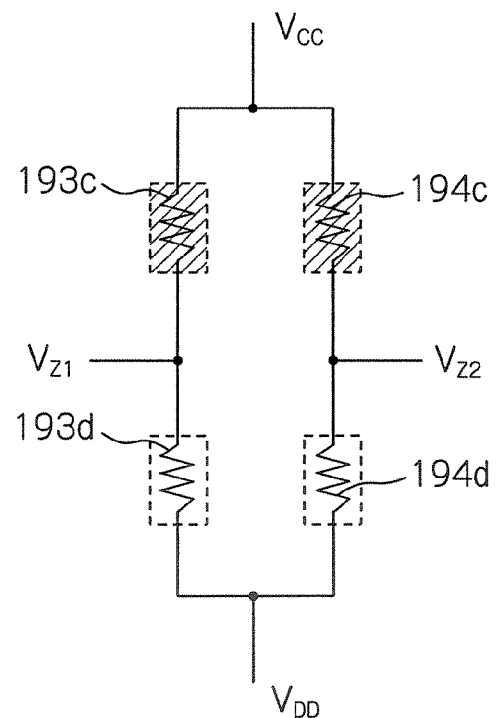

The power supply voltage $V_{CC}$-$V_{DD}$ is applied across the spin valve GMR elements 193c and 193d of the first magnetic field detection sensor 193, and a first Z-axis acceleration signal $V_{Z1}$ is derived from the signal output terminal $T_{Z1}$ connected to the central point there between. Also, the power supply voltage $V_{CC}$-$V_{DD}$ is applied across the spin valve GMR elements 194c and 194d of the second magnetic field detection sensor 194, and a second Z-axis acceleration signal $V_{Z2}$ is derived from the signal output terminal $T_{Z2}$ connected to the central point there between. Therefore, these spin valve GMR elements 193c, 193d, 194c and 194d are connected in full-bridge configuration as shown in FIG. 23b. The signals $V_{Z1}$ and $V_{Z2}$ from the respective signal output terminals $T_{Z1}$ and $T_{Z2}$ are differentially amplified to become an acceleration signal in the Z-axis direction. This acceleration signal in the Z-axis direction is provided only when the magnetic field generation member with weight 192a, that is the permanent magnets $192a_1$ and $192a_2$, and the magnetic field generation member with weight 192b, that is the permanent magnets $192b_1$ and $192b_2$, displace together to the same direction along the Z-axis direction due to the applied acceleration. When the magnetic field generation members with weights 192a and 192b displace to the opposite directions to each other, because the first and second Z-axis acceleration signals $V_{Z1}$ and $V_{Z2}$ cancel each other out, no acceleration signal in the Z-axis direction is provided.

Hereinafter, structures and operations of the spring member 191 of this embodiment will be described in detail.

FIGS. 24a, 24b and 24c illustrate operations of the spring member in this embodiment.

FIG. 24a shows a state where no external force is applied and thus no displacement occurs. When an external force $F_X$ along the X-axis direction is applied as shown in FIG. 24b, the strip-shaped plate spring 191a produces bending stresses to displace the magnetic field generation members with weights 192a and 192b in the bending direction to reach balance. In this case, the displaced directions of the both ends of the strip-shaped plate spring 191a and the magnetic field generation members with weights 192a and 192b are opposite directions each other. When an external force $F_Z$ along the Z-axis direction is applied as shown in FIG. 24c, the strip-shaped plate spring or main spring 191a produces bending stresses to displace the magnetic field generation members with weights 192a and 192b in the bending direction to reach balance. In this case, the displaced directions of the both ends of the strip-shaped plate spring 191a and the magnetic field generation members with weights 192a and 192b are the same direction. The displacement amounts of the magnetic field generation members with weights 192a and 192b are proportional to displacement angles θ of the magnetic field generation members with weights 192a and 192b. In case that the angles of the magnetic field generation members with weights thus change, the spin valve GMR elements can detect the displacement angles to know the applied external force. An external force $F_X$ along the X-axis direction is given from $F_X = \theta_{X1} - \theta_{X2}$, where $\theta_{X1}$ and $\theta_{X2}$ are displacement angles of the magnetic field generation members with weights 192a and 192b when the external force $F_X$ is applied. An external force $F_Z$ along the Z-axis direction is given from $F_Z = \theta_{Z1} + \theta_{Z2}$, where $\theta_{Z1}$ and $\theta_{Z2}$ are displacement angles of the magnetic field generation members with weights 192a and 192b when the external force $F_Z$ is applied.

When the external force $F_X$ along the X-axis direction is applied and the magnetic field generation members with weights 192a and 192c displace in the bending direction as aforementioned, angles of the bias magnetic fields applied to the spin valve GMR elements 193a and 193b and the spin valve GMR elements 194b and 194a accordingly change to the same direction. Thus, an added differential output of the first X-axis acceleration signal $V_{X1}$ and the second X-axis acceleration signal $V_{X2}$ is derived to provide it as an acceleration signal in the X-axis direction. In this case, since the first Z-axis acceleration signal $V_{Z1}$ and the second Z-axis acceleration signal $V_{Z2}$ cancel each other out, no acceleration signal in the Z-axis direction is provided.

When the external force $F_Z$ along the Z-axis direction is applied and the magnetic field generation members with weights 192a and 192c displace in the bending direction as aforementioned, angles of the bias magnetic fields applied to the spin valve GMR elements 193c and 193d and the spin valve GMR elements 194c and 194d accordingly change to the opposite directions. Thus, an added differential output of the first Z-axis acceleration signal $V_{Z1}$ and the second Z-axis acceleration signal $V_{Z2}$ is derived to provide it as an acceleration signal in the Z-axis direction. In this case, since the first X-axis acceleration signal $V_{X1}$ and the second X-axis acceleration signal $V_{X2}$ cancel each other out, no acceleration signal in the X-axis direction is provided.

According to this embodiment, because the strip-shaped plate spring 191a produces bending stress so as to displace it in the bending direction to reach balance, the spring member 191 can be configured to have an extremely small size, a large displacement amount and high sensitivity. Therefore, it is possible to provide an acceleration sensor that can expect highly sensitive detection of acceleration even though having an extremely miniaturized structure.

Also, according to this embodiment, since the two end sections of the spring member are formed in the same structure and shape, it is possible to provide an acceleration sensor with uniform sensitivity and detection directivity of any of the X-axis and Z-axis, or Y-axis and Z-axis direction accelerations to be detected.

According to this embodiment, further, because utilized is bending function of the strip-shaped plate spring 191a with the fulcrum at its center, on the both end sections of which the magnetic field generation members with weights are fixed, and because derived is a differential output between a partial output $V_{X1}$ or $V_{Z1}$ of the first magnetic field detection sensor 193 and a partial output $V_{X2}$ or $V_{Z2}$ of the second magnetic field detection sensor 194, it is possible to certainly separate and correctly derive acceleration components in the X-axis direction and the Z-axis direction.

Also, because the amount of and the positive and negative of acceleration in each of the Z-axis and X-axis directions can be sensed by only the two magnetic field detection sensors, the number of the magnetic field detection sensors can be decreased and also the structure of each sensor can be extremely simplified resulting the total size of the acceleration sensor to extremely miniaturize. Furthermore, because the spin valve GMR element is quite sensitive in magnetic field change, highly sensitive acceleration detection can be expected.

Still further, according to this embodiment, since the bias magnetic fields applied to the pair of spin valve GMR elements in each magnetic field detection sensor are in the directions opposite to each other, the magnetization directions of the respective pinned layers in these spin valve GMR elements are fixed to the same direction. Thus, two pairs of spin valve GMR elements, that is, four spin vale GMR elements can be formed in a single chip resulting the acceleration sensor to more downsize.

According to this embodiment, furthermore, because the pair of two permanent magnets provide the closed magnetic loop with widely spread magnetic field in the direction perpendicular to the lamination plane of the spin valve GMR element and the spin valve GMR element is arranged in this closed magnetic loop, only the minimum amount of magnetic field will leaked to the outside from the closed magnetic loop, that is the leakage of magnetic field will decrease, and enough bias magnetic filed will be applied to the spin valve GMR element. Therefore, even if the permanent magnet downsizes, stable and high sensitivity in acceleration detection can be obtained and also insensitivity to possible external electrical field and external magnetic field applied thereto can be expected.

According to this embodiment, further, because it is not necessary to form electrodes on the a spring member and the magnetic field generation members with weights, the wiring structure can be simplified. Also, because of a low impedance, the acceleration sensor of this embodiment is relatively unaffected by external disturbance when compared with the piezo-electric type acceleration sensor and the electrostatic capacitance type acceleration sensor.

In the aforementioned embodiment, the closed magnetic loop is formed by two permanent magnets with opposite magnetic polarities to each other on their surfaces that face the magnetic filed detection sensor. However, such closed magnetic field can be formed by combining a single permanent magnet with a yoke made of for example a soft magnetic material.

As for the magnetic field detection element, a TMR element may be used instead of the spin valve GMR element.

The acceleration sensor according to the present invention can be adopted to any devices for detecting acceleration(s) other than the magnetic disk drive apparatus as the aforementioned embodiments.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A spring member used in an acceleration sensor for supporting weights that cooperate as magnetic field generation members to generate a magnetic field to be detected by magnetic field detection members or the magnetic field detection members to detect the magnetic field generated by the magnetic field generation members, said spring member comprising:

a first strip-shaped plate spring with a fulcrum at a center of the first strip-shaped plate spring; and two second strip-shaped plate springs with centers connected to both ends of said first strip-shaped plate spring, respectively, wherein each of the second strip-shaped plate springs includes support sections at both ends of the second strip-shaped plate spring for supporting said weights, said first strip-shaped plate spring is configured to produce a bending stress or twisting stress in response to an applied external force so as to displace said weights, and the two second strip-shaped plate springs are configured to produce bending stresses in response to the applied external force so as to displace said weights.

2. The spring member as claimed in claim 1, wherein said spring member further comprises:

a strip-shaped support member directly fixed to each of the second strip-shaped plate springs or fixed to said weights attached to said support sections at both of the ends of each of the second strip-shaped plate springs, to control a spring function of each of the second strip-shaped plate springs.

3. An acceleration sensor including a housing member, four magnetic field generation members with weights, a spring member with a fulcrum attached to said housing member, and at least three magnetic field detection sensors attached to said housing member to face at least three of said four magnetic field generation members with weights, respectively, said spring member comprising:

a first strip-shaped plate spring with said fulcrum at a center of the first strip-shaped plate spring; and two second strip-shaped plate springs with centers connected to both ends of said first strip-shaped plate spring, respectively, wherein each of the second strip-shaped plate springs includes support sections at both ends of the second strip-shaped plate spring for supporting said four magnetic field generation members with the weights, said first strip-shaped plate spring is configured to produce a bending stress or twisting stress in response to an applied external force so as to displace said magnetic field generation members with the weights, and the two second strip-shaped plate springs are configured to produce bending stresses in response to the applied external force so as to displace said magnetic field generation members with the weights.

4. The acceleration sensor as claimed in claim 3, wherein said acceleration sensor further comprises:

a strip-shaped support member directly fixed to each of the second strip-shaped plate springs or fixed to said magnetic field generation members with weights attached to said support sections at both of the ends of each of the second strip-shaped plate springs, to control a spring function of each of the second strip-shaped plate springs.

5. The acceleration sensor as claimed in claim 3, wherein each of the magnetic field detection sensors has at least one pair of multi-layered magnetoresistive effect elements each including a magnetization fixed layer and a magnetization free layer, said magnetization fixed layer being magnetically fixed along a direction parallel to a direction of displacement of said first strip-shaped plate spring, and wherein each of the magnetic field generation members with the weights has at least one permanent magnet arranged to apply a magnetic field to said multi-layered magnetoresistive effect elements, said magnetic field applied being substantially perpendicular to a lamination plane of said multi-layered magnetoresistive effect elements when no acceleration is applied.

6. The acceleration sensor as claimed in claim 5, wherein said permanent magnet consists of a pair of permanent magnets arranged in parallel to each other so that surfaces of the pair of permanent magnets facing the respective magnetic field detection sensors have different magnetic polarities with each other.

7. The acceleration sensor as claimed in claim 6, wherein at least one pair of multi-layered magnetoresistive effect elements is arranged to face the pair of permanent magnets.

8. The acceleration sensor as claimed in claim 5, wherein each of the multi-layered magnetoresistive effect elements consists of a giant magnetoresistive effect element or a tunnel magnetoresistive effect element.

9. A magnetic disk drive apparatus including an acceleration sensor that has a housing member, four magnetic field generation members with weights, a spring member with a fulcrum attached to said housing member, and at least three magnetic field detection sensors attached to said housing member to face at least three of said four magnetic field generation members with weights, respectively, said spring member comprising:

a first strip-shaped plate spring with said fulcrum at a center of the first strip-shaped plate spring; and two second strip-shaped plate springs with centers connected to both ends of said first strip-shaped plate spring, respectively, wherein each of the second strip-shaped plate springs includes support sections at both ends of the second strip-shaped plate spring for supporting said four magnetic field generation members with the weights, said first strip-shaped plate spring is configured to produce a bending stress or twisting stress in response to an applied external force so as to displace said magnetic field generation members with the weights, and the two second strip-shaped plate springs are configured to produce bending stresses in response to the applied external force so as to displace said magnetic field generation members with the weights.

* * * * *